United States Patent [19]
Yukawa et al.

[11] Patent Number: 5,655,031
[45] Date of Patent: Aug. 5, 1997

[54] METHOD FOR DETERMINING ATTRIBUTES USING NEURAL NETWORK AND FUZZY LOGIC

[75] Inventors: Noriaki Yukawa, Nara-ken; Shoichi Ishii, Moriguchi; Mitsutaka Teshima, Iizuka, all of Japan

[73] Assignee: Matsushita Electric Industrial Co., Ltd., Osaka-fu, Japan

[21] Appl. No.: 491,070

[22] Filed: Jun. 16, 1995

[30] Foreign Application Priority Data

Jun. 16, 1994 [JP] Japan .................. 6-133998

[51] Int. Cl.$^6$ .................. G06K 9/46; G06K 9/66
[52] U.S. Cl. .................. 382/194; 382/156; 382/203
[58] Field of Search .................. 382/181, 159, 382/206, 174, 194, 156, 190, 192, 161, 193, 199, 200

[56] References Cited

U.S. PATENT DOCUMENTS

| | | | |
|---|---|---|---|
| 4,218,673 | 8/1980 | Yoshida | 382/194 |
| 4,864,628 | 9/1989 | Scott | 382/197 |
| 4,977,603 | 12/1990 | Trie et al. | 382/218 |
| 5,237,627 | 8/1993 | Johnson et al. | 382/209 |
| 5,479,533 | 12/1995 | Tanaka | 382/161 |
| 5,511,134 | 4/1996 | Kuratomi et al. | 382/158 |
| 5,557,689 | 9/1996 | Huttenlocher et al. | 382/177 |

OTHER PUBLICATIONS

Iinuma (Ed), "Neuro Computers", Gijutsu Hyoronsha, pp. 15–16, and pp. 21–24, Sep. 1990.

D. E. Rumelhart et al., "Learning Representations by Back-Propagating Errors", Nature, No. 323, pp. 533–536 (1986).

Primary Examiner—Michael T. Razavi
Assistant Examiner—Ha Tran Nguyen
Attorney, Agent, or Firm—Wenderoth, Lind & Ponack

[57] ABSTRACT

An attribute decision method includes steps of making a comparison between one feature value, selected from seven feature values, of an input pattern contained in an input image and membership functions determined from 37 standard patterns including alphanumeric characters of "0" to "9" and "A" to "Z" and a hyphen of "-" with respect to the selected feature value and then obtaining output values of the membership functions for the individual standard patterns with respect to the input pattern. The seven feature values are, when the input pattern is a mesh pattern, vertical structure vector sums, horizontal structure vector sums, up-down and left-right area differences, and a vertical cross number. The method also includes steps of calculating a total value of the output value for the feature value for each of the standard patterns, and determining a standard pattern of the highest total value among the calculated total values and thus deciding one of the standard patterns which has the highest similarity to the input pattern.

26 Claims, 27 Drawing Sheets

UD−VEC=
0+8+8+8+0=24

LR−VEC=
0+4+4+4+0
4+4+4+0=24

LEFT ← ┊ → RIGHT

VCN=3

Fig.11A

| | F.V.1 UD VEC | F.V.2 DU VEC | F.V.3 LR VEC | F.V.4 RL VEC | F.V.5 UD DIFF | F.V.6 LR DIFF | F.V.7 VCN |
|---|---|---|---|---|---|---|---|
| 1 | 2 | 2 | 2 | 2 | 0 | 0 | 2 |
| 2 | 0 | 32 | 32 | 0 | 4 | −8 | 1 |
| 3 | 2 | 0 | 11 | 15 | −1 | 1 | 3 |
| 4 | 2 | 2 | 19 | 3 | 0 | −4 | 3 |
| 5 | 10 | 12 | 15 | 5 | −2 | −2 | 2 |
| 6 | 0 | 2 | 9 | 14 | 1 | 2 | 3 |
| 7 | 2 | 2 | 2 | 11 | −2 | 3 | 3 |
| 8 | 0 | 24 | 19 | 9 | 5 | −3 | 2 |
| 9 | 2 | 2 | 3 | 3 | 0 | 0 | 3 |
| 10 | 2 | 2 | 11 | 2 | 2 | −3 | 3 |
| 11 | 6 | 9 | 3 | 3 | −4 | 0 | 2 |
| 12 | 1 | 1 | 0 | 3 | 0 | 3 | 3 |
| 13 | 2 | 2 | 2 | 22 | 0 | 5 | 2 |
| 14 | 3 | 3 | 0 | 6 | 0 | 4 | 2 |
| 15 | 0 | 0 | 0 | 25 | 0 | 7 | 3 |
| 16 | 0 | 20 | 0 | 29 | 4 | 8 | 2 |
| 17 | 2 | 2 | 2 | 10 | −2 | 1 | 2 |
| 18 | 12 | 12 | 0 | 0 | 0 | 0 | 1 |
| 19 | 0 | 0 | 14 | 14 | 0 | 0 | 1 |
| 20 | 30 | 2 | 25 | 1 | −4 | −6 | 1 |
| 21 | 6 | 6 | 0 | 16 | 0 | 7 | 2 |
| 22 | 32 | 0 | 0 | 32 | −4 | 8 | 1 |
| 23 | 4 | 18 | 0 | 0 | 4 | 0 | 1 |
| 24 | 10 | 10 | 0 | 0 | 0 | 0 | 1 |
| 25 | 6 | 6 | 6 | 6 | 0 | 0 | 2 |
| 26 | 1 | 17 | 0 | 18 | 6 | 6 | 2 |
| 27 | 6 | 4 | 6 | 4 | −2 | −1 | 3 |
| 28 | 1 | 7 | 0 | 7 | 2 | 4 | 2 |
| 29 | 2 | 2 | 12 | 12 | 0 | 0 | 3 |
| 30 | 0 | 32 | 16 | 16 | 4 | 0 | 1 |
| 31 | 24 | 2 | 1 | 1 | −1 | 0 | 1 |
| 32 | 22 | 6 | 3 | 3 | 1 | 0 | 1 |
| 33 | 19 | 3 | 1 | 1 | −2 | 0 | 1 |
| 34 | 10 | 10 | 4 | 4 | 0 | 0 | 1 |
| 35 | 10 | 22 | 11 | 11 | 4 | 0 | 1 |
| 36 | 0 | 0 | 12 | 12 | 0 | 0 | 3 |
| 37 | 20 | 20 | 40 | 40 | 0 | 0 | 1 |

Fig.11B

| | F.V.8 SUB VEC 1 | F.V.9 SUB VEC 2 | F.V.10 UD MAX | F.V.11 DU MAX | F.V.12 ULR MAX | F.V.13 DLR MAX | F.V.14 URL MAX | F.V.15 DRL MAX |
|---|---|---|---|---|---|---|---|---|
| 1 | 0 | 0 | 1 | 1 | 1 | 1 | 1 | 1 |
| 2 | −32 | 32 | 0 | 8 | 4 | 4 | 0 | 0 |
| 3 | 2 | −4 | 1 | 0 | 4 | 1 | 1 | 4 |
| 4 | 0 | 16 | 1 | 1 | 4 | 4 | 1 | 1 |
| 5 | −2 | 10 | 5 | 3 | 2 | 4 | 3 | 0 |
| 6 | −2 | −5 | 0 | 1 | 0 | 4 | 4 | 1 |
| 7 | 0 | −9 | 1 | 1 | 1 | 1 | 4 | 1 |
| 8 | −24 | 10 | 0 | 8 | 4 | 2 | 0 | 2 |
| 9 | 0 | 0 | 1 | 1 | 1 | 1 | 1 | 1 |
| 10 | 0 | 9 | 1 | 1 | 1 | 4 | 1 | 1 |
| 11 | −3 | 0 | 2 | 3 | 2 | 0 | 2 | 0 |
| 12 | 0 | −3 | 1 | 1 | 0 | 0 | 1 | 1 |
| 13 | 0 | −20 | 1 | 1 | 1 | 1 | 4 | 4 |
| 14 | 0 | −6 | 2 | 2 | 0 | 0 | 2 | 2 |
| 15 | 0 | −25 | 0 | 0 | 0 | 0 | 4 | 4 |
| 16 | −20 | −29 | 0 | 8 | 0 | 0 | 4 | 4 |
| 17 | 0 | −8 | 1 | 1 | 1 | 1 | 4 | 1 |
| 18 | 0 | 0 | 4 | 4 | 0 | 0 | 0 | 0 |
| 19 | 0 | 0 | 0 | 0 | 2 | 2 | 2 | 2 |
| 20 | 28 | 24 | 8 | 1 | 4 | 4 | 0 | 1 |
| 21 | 0 | −16 | 3 | 3 | 0 | 0 | 3 | 3 |
| 22 | 32 | −32 | 8 | 0 | 0 | 0 | 4 | 4 |
| 23 | −14 | 0 | 2 | 7 | 0 | 0 | 0 | 0 |
| 24 | 0 | 0 | 6 | 6 | 0 | 0 | 0 | 0 |
| 25 | 0 | 0 | 2 | 2 | 2 | 2 | 2 | 2 |
| 26 | −16 | −18 | 1 | 5 | 0 | 0 | 1 | 4 |
| 27 | 2 | 2 | 2 | 2 | 2 | 2 | 2 | 1 |
| 28 | −6 | −7 | 1 | 4 | 0 | 0 | 1 | 2 |
| 29 | 0 | 0 | 1 | 1 | 1 | 4 | 4 | 1 |
| 30 | −32 | 0 | 0 | 8 | 2 | 2 | 2 | 2 |
| 31 | 22 | 0 | 8 | 1 | 0 | 1 | 0 | 1 |
| 32 | 16 | 0 | 8 | 2 | 0 | 2 | 0 | 2 |
| 33 | 16 | 0 | 8 | 1 | 0 | 1 | 0 | 1 |
| 34 | 0 | 0 | 4 | 4 | 1 | 1 | 1 | 1 |
| 35 | −12 | 0 | 4 | 6 | 1 | 2 | 1 | 2 |
| 36 | 0 | 0 | 0 | 0 | 4 | 1 | 1 | 4 |
| 37 | 0 | 0 | 4 | 4 | 5 | 5 | 5 | 5 |

Fig.11C

| | F.V.16<br>UD<br>CMP | F.V.17<br>LR<br>CMP | F.V.18<br>RUD<br>CMP | F.V.19<br>RLR<br>CMP |
|---|---|---|---|---|
| 1 | 0 | 0 | 0 | 0 |
| 2 | 8 | 4 | 10 | 10 |
| 3 | 5 | 7 | 3 | 3 |
| 4 | 4 | 0 | 4 | 4 |
| 5 | 4 | 8 | 6 | 8 |
| 6 | 6 | 7 | 4 | 3 |
| 7 | 3 | 2 | 3 | 2 |
| 8 | 3 | 11 | 9 | 11 |
| 9 | 0 | 0 | 0 | 0 |
| 10 | 3 | 2 | 3 | 2 |
| 11 | 0 | 10 | 8 | 10 |
| 12 | 3 | 0 | 3 | 2 |
| 13 | 5 | 0 | 5 | 4 |
| 14 | 8 | 0 | 8 | 8 |
| 15 | 7 | 0 | 7 | 6 |
| 16 | 8 | 4 | 10 | 10 |
| 17 | 3 | 2 | 3 | 2 |
| 18 | 0 | 0 | 0 | 0 |
| 19 | 0 | 0 | 0 | 0 |
| 20 | 6 | 6 | 8 | 8 |
| 21 | 11 | 0 | 11 | 10 |
| 22 | 8 | 4 | 10 | 10 |
| 23 | 0 | 4 | 2 | 4 |
| 24 | 4 | 4 | 0 | 0 |
| 25 | 0 | 0 | 0 | 0 |
| 26 | 6 | 6 | 8 | 8 |
| 27 | 1 | 2 | 1 | 2 |
| 28 | 6 | 10 | 8 | 10 |
| 29 | 4 | 4 | 0 | 0 |
| 30 | 0 | 4 | 4 | 4 |
| 31 | 0 | 5 | 4 | 5 |
| 32 | 0 | 7 | 6 | 7 |
| 33 | 0 | 6 | 4 | 6 |
| 34 | 0 | 0 | 0 | 0 |
| 35 | 0 | 12 | 8 | 12 |
| 36 | 4 | 4 | 0 | 0 |
| 37 | 0 | 0 | 0 | 0 |

Fig.11D

| | F.V.20<br>AREA 1 | F.V.21<br>AREA 2 | F.V.22<br>AREA 3 | F.V.23<br>AREA 4 | F.V.24<br>AREA 5 | F.V.25<br>AREA 6 | F.V.26<br>AREA 7 |
|---|---|---|---|---|---|---|---|
| 1 | 3 | 3 | 3 | 3 | 3 | 3 | 0 |
| 2 | 3 | 3 | 3 | 0 | 0 | 0 | 0 |
| 3 | 3 | 2 | 0 | 3 | 2 | 1 | 1 |
| 4 | 3 | 3 | 3 | 3 | 1 | 1 | 3 |
| 5 | 1 | 2 | 3 | 0 | 1 | 2 | 0 |
| 6 | 3 | 0 | 3 | 3 | 1 | 3 | 3 |
| 7 | 3 | 1 | 3 | 3 | 3 | 3 | 3 |
| 8 | 3 | 3 | 0 | 1 | 0 | 1 | 1 |
| 9 | 3 | 3 | 3 | 3 | 3 | 3 | 3 |
| 10 | 3 | 3 | 3 | 3 | 1 | 3 | 3 |
| 11 | 1 | 2 | 3 | 0 | 3 | 2 | 0 |
| 12 | 3 | 3 | 3 | 3 | 3 | 3 | 3 |
| 13 | 3 | 1 | 1 | 3 | 3 | 3 | 0 |
| 14 | 2 | 2 | 2 | 2 | 3 | 3 | 0 |
| 15 | 3 | 0 | 0 | 3 | 3 | 3 | 3 |
| 16 | 3 | 0 | 0 | 0 | 3 | 3 | 3 |
| 17 | 3 | 1 | 3 | 3 | 3 | 3 | 1 |
| 18 | 0 | 3 | 3 | 0 | 3 | 3 | 3 |
| 19 | 3 | 0 | 0 | 3 | 0 | 0 | 1 |
| 20 | 0 | 3 | 3 | 3 | 2 | 0 | 0 |
| 21 | 0 | 0 | 0 | 0 | 3 | 3 | 0 |
| 22 | 0 | 0 | 0 | 3 | 3 | 3 | 0 |
| 23 | 0 | 3 | 3 | 0 | 3 | 3 | 1 |
| 24 | 0 | 3 | 3 | 0 | 3 | 3 | 1 |
| 25 | 1 | 2 | 2 | 1 | 2 | 2 | 0 |
| 26 | 3 | 3 | 0 | 0 | 3 | 3 | 3 |
| 27 | 1 | 2 | 2 | 1 | 2 | 2 | 0 |
| 28 | 3 | 3 | 0 | 0 | 3 | 3 | 3 |
| 29 | 3 | 1 | 2 | 3 | 1 | 2 | 1 |
| 30 | 3 | 0 | 0 | 1 | 0 | 0 | 1 |
| 31 | 0 | 3 | 3 | 3 | 3 | 3 | 0 |
| 32 | 0 | 3 | 2 | 1 | 2 | 3 | 0 |
| 33 | 0 | 3 | 3 | 2 | 3 | 3 | 1 |
| 34 | 0 | 2 | 2 | 0 | 2 | 2 | 1 |
| 35 | 0 | 2 | 0 | 1 | 0 | 2 | 1 |
| 36 | 3 | 2 | 0 | 3 | 2 | 0 | 1 |
| 37 | 0 | 0 | 0 | 0 | 0 | 0 | 3 |

| CHARACTER | UD VEC | DU VEC | LR VEC | RL VEC | UD DIFF | LR DIFF | VCN | TOTAL |
|---|---|---|---|---|---|---|---|---|
| ⋮ | ⋮ | ⋮ | ⋮ | ⋮ | ⋮ | ⋮ | ⋮ | ⋮ |
| 2 | 1.00 | 1.00 | 1.00 | 1.00 | 1.00 | 1.00 | 1.00 | 7.00 |
| 3 | 1.00 | 0.50 | −1.00 | −1.00 | 1.00 | −0.20 | 1.00 | 1.30 |
| ⋮ | ⋮ | ⋮ | ⋮ | ⋮ | ⋮ | ⋮ | ⋮ | ⋮ |
| C | 1.00 | 0.50 | −1.00 | −1.00 | 1.00 | −0.40 | 0.00 | 0.10 |
| ⋮ | ⋮ | ⋮ | ⋮ | ⋮ | ⋮ | ⋮ | ⋮ | ⋮ |
| E | 1.00 | 1.00 | −1.00 | −1.00 | 1.00 | −0.80 | 1.00 | 1.20 |
| ⋮ | ⋮ | ⋮ | ⋮ | ⋮ | ⋮ | ⋮ | ⋮ | ⋮ |
| I | 1.00 | 1.00 | 0.00 | 1.00 | 1.00 | 1.00 | −1.00 | 4.00 |
| ⋮ | ⋮ | ⋮ | ⋮ | ⋮ | ⋮ | ⋮ | ⋮ | ⋮ |
| S | 1.00 | 0.50 | 1.00 | 0.50 | 1.00 | 1.00 | 1.00 | 6.00 |
| ⋮ | ⋮ | ⋮ | ⋮ | ⋮ | ⋮ | ⋮ | ⋮ | ⋮ |
| Z | 1.00 | 1.00 | 1.00 | 0.50 | 1.00 | 1.00 | 1.00 | 6.50 |
| ⋮ | ⋮ | ⋮ | ⋮ | ⋮ | ⋮ | ⋮ | ⋮ | ⋮ |

| CHARACTER | NN | UD VEC | DU VEC | LR VEC | RL VEC | UD DIFF | LR DIFF | VCN | TOTAL |
|---|---|---|---|---|---|---|---|---|---|
| 2 | 6.71 | 1.00 | 1.00 | 1.00 | 1.00 | 1.00 | 1.00 | 1.00 | 13.71 |
| 3 | 0.56 | 1.00 | 0.50 | −1.00 | −1.00 | 1.00 | −0.20 | 1.00 | 1.86 |
| C | 0.17 | 1.00 | 0.50 | −1.00 | −1.00 | 1.00 | −0.40 | 0.00 | 0.07 |
| E | 0.55 | 1.00 | 1.00 | −1.00 | −1.00 | 1.00 | −0.80 | 1.00 | 1.75 |
| I | 0.21 | 1.00 | 1.00 | 0.00 | 1.00 | 1.00 | 1.00 | −1.00 | 4.21 |
| S | 0.15 | 1.00 | 0.50 | 1.00 | 0.50 | 1.00 | 1.00 | 1.00 | 6.15 |
| Z | 2.01 | 1.00 | 1.00 | 1.00 | 0.50 | 1.00 | 1.00 | 1.00 | 8.51 |

UD—CMP =3

LR—CMP =0

RUD—CMP =2

RLR—CMP =2

Fig.30

| | | 2 | | 9 | | A | | F | |
|---|---|---|---|---|---|---|---|---|---|
| | | ONLY NN | NN&FUZZY | ONLY NN | NN&FUZZY | ONLY NN | NN&FUZZY | ONLY NN | NN&FUZZY |
| CORRECT ○ | | 21/30 (70.0%) | 26/30 (86.7%) | 13/30 (43.3%) | 27/30 (90.0%) | 24/30 (80.0%) | 27/30 (90.0%) | 24/30 (80.0%) | 28/30 (93.3%) |
| DETAIL | | (1) 12 (2) 9 | (1) 12 (2) 5 (3) 9 (4) 0 | (1) 5 (2) 8 (3) 15 (4) 4 | (1) 5 (2) 3 (3) 15 (4) 4 | (1) 13 (2) 11 | (1) 13 (2) 3 (3) 10 (4) 1 | (1) 18 (2) 6 | (1) 18 (2) 1 (3) 7 (4) 2 |
| ERROR × | | 1/30 | 0/30 | 4/30 | 1/30 | 0/30 | 0/30 | 0/30 | 0/30 |
| UNDE-CIDABLE ? | | 8/30 | 4/30 | 13/30 | 2/30 | 6/30 | 3/30 | 6/30 | 2/30 |
| RECOGNITION RATE | | 21/22 (95.5%) | 26/26 (100.0%) | 13/17 (76.5%) | 27/28 (96.4%) | 24/24 (100.0%) | 27/27 (100.0%) | 24/24 (100.0%) | 28/28 (100.0%) |

\* RECOGNITION RATE=(CORRECT NUMBER)/(CORRECT NUMBER+ERROR NUMBER)

METHOD FOR DETERMINING ATTRIBUTES USING NEURAL NETWORK AND FUZZY LOGIC

BACKGROUND OF THE INVENTION

The present invention relates to an attribute decision method for deciding what type a pattern contained in an input image belongs to, by using a signal processor comprising a signal input device such as TV camera and a computer.

In recent years, it has become one of important issues in the test processes of industrial products or the like to implement accurate type classification, failure classification, and the like of the products. These processes are under an intense desire that they be automated, and image processing apparatuses comprising an image input device, such as a TV camera, and a computer are widely used. For example, a character recognition device using a TV camera that automatically identifies serial numbers or the like inscribed on products can be referred to as one of them.

Below described is an example of the conventional character recognition device using a TV camera. FIG. 15 outlines the construction of the device. Illuminating light is applied from a light source 15 to a surface of an object 11 via a half mirror 14, while an image of the surface of the object 11 is picked up by a TV camera 12 via the half mirror 14. This TV camera 12, provided with a CCD sensor, is able to obtain a gray level signal for each pixel, which signal is processed in a recognition processing unit 13 in digitized form. It is needless to say that the recognition processing unit 13 is equipped with a memory unit for storing image data and storage for containing programs with which the character recognition process is executed.

FIG. 16 shows the construction of the recognition processing unit. An image signal (a) outputted by the TV camera 12 is inputted to an A/D (Analog-to-Digital) converter (conversion circuit) 21, and a digital signal (b) outputted in digitized form by the A/D converter 21 is stored in an image memory 22. The image memory 22 outputs image data (c), which is then converted into a binary image (d) by a binarization circuit 23. The binarization circuit 23 performs such a binarization that character portions in the image data 27 are made into "black" and background portions are made into "white", as shown in FIG. 17. The binary image (d) is inputted to a character cut-out circuit 24, where a cut-out image (e) is outputted. The character cut-out circuit 24 detects a circumscribing rectangle 28 for each one character, as shown in FIG. 18, to separate a character train into individual characters. For this cutting-out of characters, it is often the case that characters are separated off based on projection data projected on the horizontal and vertical axes. The cut-out image (e) with individual characters separated off is inputted to a normalization circuit 25, where mesh pattern data (f) is outputted. In the normalization circuit 25, the pixels present in the circumscribing rectangle of each character are normalization-transformed into a pattern of an appropriate mesh size. The transformation from a plurality of pixels into a correspondent mesh is performed by using their average, maximum, minimum, median, most frequent value, and the like. FIG. 19 illustrates how an image 29 resulting from the character-by-character separation is transformed into a mesh pattern 30 of a lateral 5×longitudinal 9 mesh size. The mesh pattern data (f) is inputted to a character decision circuit 26, where a character decision result (g) is outputted. As the characters, for industrial use, most often used are alphanumeric characters of "0" to "9" and "A" to "Z" and a hyphen of "-", totaling 37 characters. The character decision circuit 26 outputs, as a result of decision, which character the mesh pattern data is closest to. FIG. 20 illustrates standard pattern data of the aforementioned 37 characters.

Neural networks (hereinafter, represented as NNs) are often used as the character decision circuit 26. Whereas the NNs are available in various types of organizations (reference literature: Iinuma (Ed.), "Neuro Computers", Gijutsu Hyoronsha, September 1990), the organization of a perceptron type NN, which is commonly applied in actual cases, is shown in FIG. 21. This NN comprises three layers of an input layer, an intermediate layer, and an output layer, where each layer is composed of a multiplicity of non-linear elements called neurons. In the input layer, there exist 45 (lateral 5×longitudinal 9) neurons which can assume a value of "0" showing a background portion and another of "1" showing a character portion. In the output layer, there exist 37 neurons corresponding to the alphanumeric characters "0" through "9", "A" through "Z", and the hyphen of "-", which are characters to be decided. In the present example, the connection between the input layer and the intermediate layer, and that between the intermediate layer and the output layer are implemented by connections between their neurons, where a weight ($\omega$) is defined on a connection. Each neuron sums up products of an output (y) of a neuron connected thereto and a weight ($\omega$) defined on the connection with respect to all the connections, and subjects the summing-up result to nonlinear function processing, thus yielding an output value of 0.0 to 1.0. In this process, the NN can be provided with various characteristics depending on the value of the weight ($\omega$). The weight is determined by giving actual data to see whether or not an expected output is produced by neurons of the output layer, and then repeating correction of the weight by the error of the output result over and over. The Backpropagation is often used as the method for this correction (D. E. Rumelhart, et al.: Learning Representations by Back-Propagating Errors, Nature, No. 323, pp. 533–536 (1986)). That is, standard pattern data is given to the input layer and, by assuming such an expected output of the output layer that neurons corresponding to the character are made 1.0 while the other neurons are made 0.0, the correction of weight ($\omega$) by the degree of the resulting error is repeated many times for the determination of the weight. In the example, the correction process is repeated until the error between the values of all the neurons of the output layer and the expected output value becomes 0.1 or less. In a decision process rendered on the NN that is over the correction process, as shown in FIG. 22, when an "A" is inputted to the input layer, the output of the neuron corresponding to the "A" in the output layer become large as compared with the other neurons. Ideally, the output value of the neuron corresponding to the "A" become close to 1.0 while the output values of the other neurons become close to 0.0. In the example, the character decision conditions are set as follows:

1) If an output value of a neuron in the output layer become 0.7 or more which is experimentally determined, its corresponding character is taken as a decided character (decision condition (1));

2) If the first largest value is 0.4 or more which is experimentally determined, and the difference between the first largest value and the second largest value of output values of the neurons in the output layer is 0.3 or more, the character corresponding to the first largest value is taken as a decided character (decision condition (2)); and 3) If no such value is outputted from any neuron in the output layer, it is taken as "?", undecidable.

However, the above conventional method using an NN has had a problem that the attribute decision (character decision) could not be accomplished at the demanded reliability. This is explained below based on an actual example.

The example was carried out with the standard pattern data as shown in FIG. 20 by performing a learning on a network comprising an input layer of 45 neurons (binary (0, 1) pattern of lateral 5×longitudinal 9), an intermediate layer of 45 neurons, and an output layer of 37 neurons (alphanumeric "0" to "9" and "A" to "Z", and hyphen "-").

FIGS. 23 to 26 show character patterns used for the test of character decision, including each 30 patterns of four characters, "2", "9", "A", and "F". In the figures, a black "1" is denoted by a "●" and a white "0" is denoted by a "_".

Referring to typical results as to the character "2", in the data (1) of FIG. 23, the first largest output of the neurons in the output layer occurs to "2", the value being 0.86, so that the decision condition (1) is satisfied. In the data (2) of FIG. 23, the first largest output of the neurons in the output layer occurs to "2", the value being 0.63, and the second largest output of the neurons in the output layer occurs to "Z", the value being 0.12, so that their difference is 0.51 and therefore the decision condition (2) is satisfied. However, in the data (4) of FIG. 23, the first largest output of the neurons in the output layer occurs to "2", the value being is 0.34, and the second largest output of the neurons in the output layer occurs to "S", the value being 0.15 so that their difference is 0.19 and therefore the result is undecidable. Similarly, in the data (9) of FIG. 23, the first largest output of the neurons in the output layer occurs to "2", the value being 0.58, and the second largest output of the neurons in the output layer occurs to "C", the value being 0.48, so that their difference is 0.10 and therefore the result is undecidable.

Referring to typical results as to the character "9", in the data (1) of FIG. 24, the first largest output of the neurons in the output layer occurs to "9", the value being 0.90, so that the decision condition (1) is satisfied. In the date (3) of FIG. 24, the first largest output of the neurons in the output layer occurs to "9", the value being 0.37, and the second largest output of the neurons in the output layer occurs to "5", the value being 0.07, so that their difference is 0.30 and therefore the decision condition (2) is satisfied. However, in the data (2) of FIG. 24, the first largest output of the neurons in the output layer occurs to "9", the value being 0.27, and the second largest output of the neurons in the output layer occurs to "3", the value being 0.07, so that their difference is 0.20 and therefore the result is undecidable. Similarly, in the data (8) of FIG. 24, the first largest output of the neurons in the output layer occurs to "9", the value being 0.38, and the second largest output of the neurons in the output layer occurs to "S", the value being 0.18, so that their difference is 0.20 and therefore the result is undecidable.

Referring to typical results as to the character "A", in the data (1) of FIG. 25, the first largest output of the neurons in the output layer occurs to "A", the value being 0.91, so that the decision condition (1) is satisfied. In the data (3) of FIG. 25, the first largest output of neurons in the output layer occurs to "A", the value being 0.66, and the second largest output of the neurons in the output layer occurs to "4", the value being 0.11, so that their difference is 0.55 and therefore the decision condition (2) is satisfied. However, in the data (22) of FIG. 25, the first largest output of the neurons in the output layer occurs to "A", the value being 0.22, and the second largest output of the neurons in the output layer occurs to "M", the value being 0.08, so that their difference is 0.14 and therefore the result is undecidable. Similarly, in the data (26) of FIG. 25, the first largest output of the neurons in the output layer occurs to "Q", the value being 0.52, and the second largest output of the neurons in the output layer occurs to "A", the value being 0.38, so that their difference is 0.14 and therefore the result is undecidable.

Referring to typical results as to the character "F", in the data (1) of FIG. 26, the first largest output of the neurons in the output layer occurs to "F", the value being 0.91, so that the decision condition (1) is satisfied. In the data (3) of FIG. 26, the first largest output of the neurons in the output layer occurs to "F", the value being 0.65, and the second largest output of the neurons in the output layer occurs to "P", the value being 0.27, so that their difference is 0.38 and therefore the decision condition (2) is satisfied. However, in the data (5) of FIG. 26, the first largest output of the neurons in the output layer occurs to "K", the value being 0.12, and the second largest output of the neurons in the output layer occurs to "F", the value being 0.09, so that their difference is 0.03 and therefore the result is undecidable. Similarly, in the data (6) of FIG. 26, the first largest output of the neurons in the output layer occurs to "K", the value being 0.11, and the second largest output of the neurons in the output layer occurs to "F", the value being 0.09, so that their difference is 0.02 and therefore the result is undecidable.

In the above example, although those departing far from the standard pattern data are included in the example characters, they are discriminatable for man one way or another. The results of the example upon all of the 120 characters were $82/120$ (68%) of correct responses, $5/120$ (4%) of erroneous responses, and $33/120$ (28%) of undecidable responses. As seen from these results, there exists a problem in the large portions of erroneous and undecidable responses.

Also, even if efforts are made to change the organization with a view to improvement in the ability of the NN, it would encounter a problem that the internal structure is provided in a black box fashion so that an optimum method is difficult to find, because of the NN's self-organization in the way of determining the weight ($\omega$) by giving actual data and expected outputs corresponding thereto.

SUMMARY OF THE INVENTION

In view of the aforementioned problems of the prior art, an object of the present invention is to provide an attribute decision method which exhibits a high ratio of correct responses in attribute decision enough to achieve high reliability attribute decision, and which also allows its ability improvement to be easily attained.

In accomplishing these and other objects, according to a first aspect of the present invention, there is provided an attribute decision method comprising steps of:

making a comparison between one feature value, selected from seven feature values, of an input pattern contained in an input image and membership functions determined from 37 standard patterns including alphanumeric characters of "0" through "9" and "A" through "Z" and a hyphen of "-" with respect to the selected feature value and then obtaining output values of the membership functions for the individual standard patterns with respect to the input pattern, the seven feature values being, when the input pattern is
a mesh pattern, vertical structure vector sums which are obtained by determining a number of white meshes counted along each column top to bottom and bottom to top until a first black mesh is encountered in data of the mesh pattern and by summing up their results,
horizontal structure vector sums which are obtained by determining a number of white meshes counted along each row left to right and right to left until a first black mesh is encountered in the data of the mesh pattern and by summing up their results, up-down and left-right area differences which are obtained by determining differences in areas of black meshes between upper and lower halves and between left and right halves in the data of the mesh pattern, and a vertical cross number which is obtained by determining a number of times of crossing with black meshes counted along a center of columns in a vertical direction;

calculating a total value of the output value for the feature value for each of the standard patterns; and determining a standard pattern of the highest total value among the calculated total values and thus deciding one of the standard patterns which has the highest similarity to the input pattern.

According to a second aspect of the present invention, there is provided an attribute decision method comprising steps of:

making a comparison between one feature value, selected from seven feature values, of an input pattern contained in an input image and membership functions determined from 26 standard patterns including alphabetic characters of "A" to "Z" with respect to the selected feature value and then obtaining output values of the membership functions for the individual standard patterns with respect to the input pattern, the seven feature values being, when the input pattern is a mesh pattern, vertical structure vector sums which are obtained by determining a number of white meshes counted along each column top to bottom and bottom to top until a first black mesh is encountered in data of the mesh pattern and by summing up their results, horizontal structure vector sums which are obtained by determining a number of white meshes counted along each row left to right and right to left until a first black mesh is encountered in the data of the mesh pattern and by summing up their results, up-down and left-right area differences which are obtained by determining differences in areas of black meshes between upper and lower halves and between left and right halves in the data of the mesh pattern, and a vertical cross number which is obtained by determining a number of times of crossing with black meshes counted along a center of columns in a vertical direction;

calculating a total value of the output value for the feature value for each of the standard patterns; and determining a standard pattern of the highest total value among the calculated total values and thus deciding one of the standard patterns which has the highest similarity to the input pattern.

According to a third aspect of the present invention, there is provided an attribute decision method comprising steps of:

making a comparison between one feature value, selected from seven feature values, of an input pattern contained in an input image and membership functions determined from 10 standard patterns including numerical characters of "1" to "0" with respect to the selected feature value and then obtaining output values of the membership functions for the individual standard patterns with respect to the input pattern, the seven feature values being, when the input pattern is a mesh pattern, vertical structure vector sums which are obtained by determining a number of white meshes counted along each column top to bottom and bottom to top until a first black mesh is encountered in data of the mesh pattern and by summing up their results, horizontal structure vector sums which are obtained by determining a number of white meshes counted along each row left to right and right to left until a first black mesh is encountered in the data of the mesh pattern and by summing up their results, up-down and left-right area differences which are obtained by determining differences in areas of black meshes between upper and lower halves and between left and right halves in the data of the mesh pattern, and a vertical cross number which is obtained by determining a number of times of crossing with black meshes counted along a center of columns in a vertical direction;

calculating a total value of the output value for the feature value for each of the standard patterns; and determining a standard pattern of the highest total value among the calculated total values and thus deciding one of the standard patterns which has the highest similarity to the input pattern.

BRIEF DESCRIPTION OF THE DRAWINGS

These and other objects and features of the present invention will become clear from the following description taken in conjunction with the preferred embodiments thereof with the preferred embodiments thereof with reference to the accompanying drawings, in which:

FIGS. 11A, 11B, 11C, and 11D are views showing the reference feature values corresponding to standard mesh pattern data in the same embodiment;

FIGS. 12A and 12B are views showing an object mesh pattern and a decision result corresponding to the object pattern "2" in the same embodiment;

FIGS. 14A and 14B are views showing an object mesh pattern and a decision result corresponding to the object pattern "2" in the same embodiment;

FIG. 30 is an evaluation result showing recognition rates in the first embodiment (ONLY NN) and the second embodiment (NN and FUZZY).

DETAILED DESCRIPTION OF THE PREFERRED EMBODIMENTS

Figure 1:
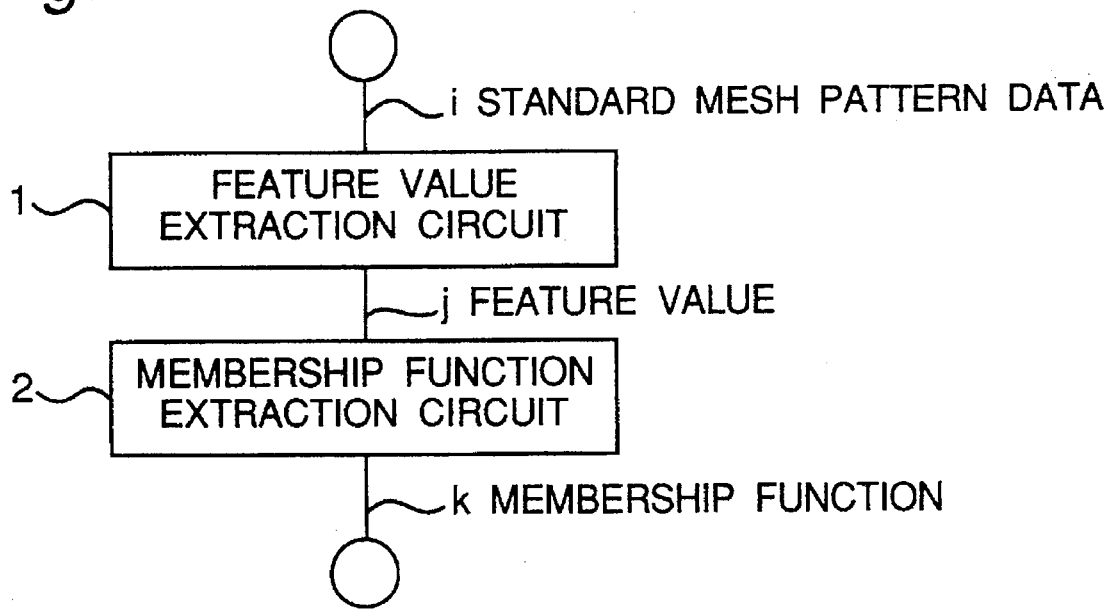
FIG. 1 is a flow chart of processing of the learning method in an attribute decision method of an embodiment of the present invention.

Before the description of the present invention proceeds, it is to be noted that like parts are designated by like reference numerals throughout the accompanying drawings.

An attribute decision method according to a first embodiment of the present invention is described below with reference to FIGS. 1 through 12.

Figure 2:
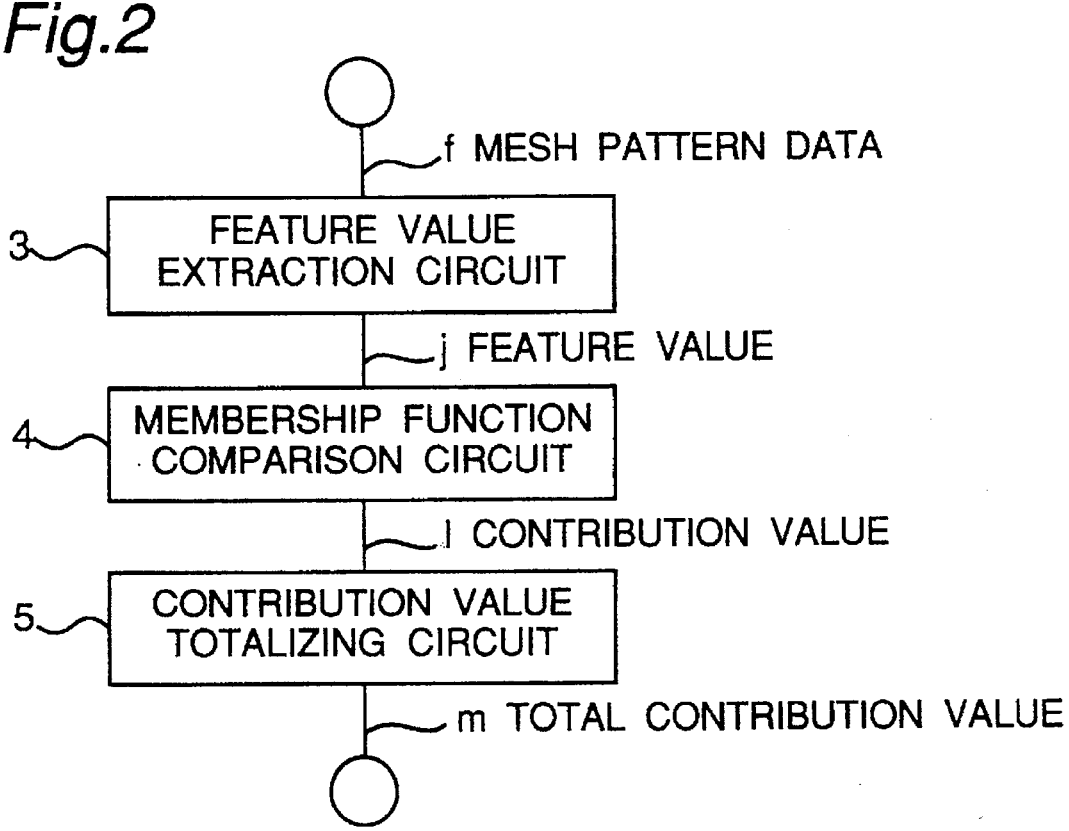
FIG. 2 is a flow chart of processing of the decision method in the same embodiment.

FIG. 1 shows the flow of processing of the learning method in the attribute decision method. FIG. 2 shows the flow of processing of the attribute decision method. An input pattern is obtained by the same processes as those of the prior art. A mesh pattern meshed into binary levels is subjected to the following processes. In this case, a mesh pattern of lateral 5×longitudinal 9 is used for explanation.

First described is the learning method. This is done to determine a membership function from a feature value required to decide a character.

Standard mesh pattern data i is inputted to a feature value extraction circuit 1, from which necessary feature values j are outputted. In this case, used as the feature values j are feature values 1 to 7 including a vertical structure vector sum 1, a vertical structure vector sum 2, a horizontal structure vector sum 1, a horizontal structure vector sum 2, an up-down area difference, a left-right area difference, and a vertical cross number.

Figure 3:
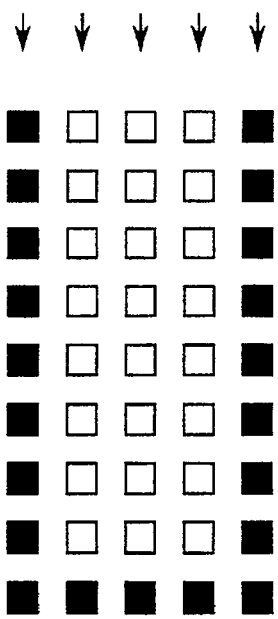
FIG. 3 is an explanatory view of a vertical structure vector sum, which is a feature value in the same embodiment.
Figure 4:
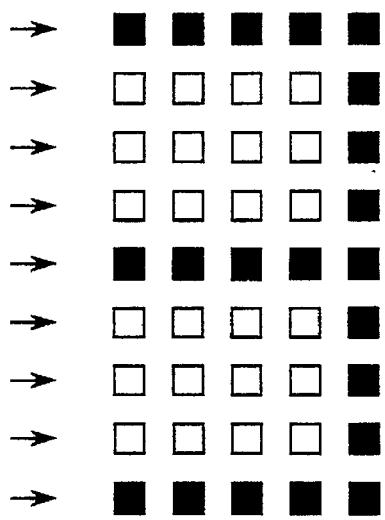
FIG. 4 is an explanatory view of a horizontal structure vector sum, which is a feature value in the same embodiment.

The vertical structure vector sum 1 (feature value 1: UDVEC), as shown in FIG. 3, is a feature value obtained by determining the number of white meshes counted along each column top to bottom until the first black mesh is encountered, and then by summing up the results. In an example of "U" in FIG. 3, the vertical structure vector sum 1 is determined to be 0+8+8+8+0=24.

The vertical structure vector sum 2 (feature value 2: DUVEC) is a feature value obtained by determining the number of white meshes counted along each column bottom to top until the first black mesh is encountered, and then by summing up the results. In the example of "U" in FIG. 3, the vertical structure vector sum 2 is determined to be 0+0+0+0+0=0.

The horizontal structure vector sum 1 (feature value 3: LRVEC) is a feature value obtained by determining the number of white meshes counted along each row left to right until the first black mesh is encountered, and then by summing up the results. In an example of "3" in FIG. 4, the horizontal structure vector sum 1 is determined to be 0+4+4+4+0+4+4+4+0=24.

The horizontal structure vector sum 2 (feature value 4: RLVEC) is a feature value obtained by determining the number of white meshes counted along each row right to left until the first black mesh is encountered, and then by summing up the results. In the example of "3" in FIG. 4, the horizontal structure vector sum 2 is determined to be 0+0+0+0+0+0+0+0+0=0.

Figure 5:
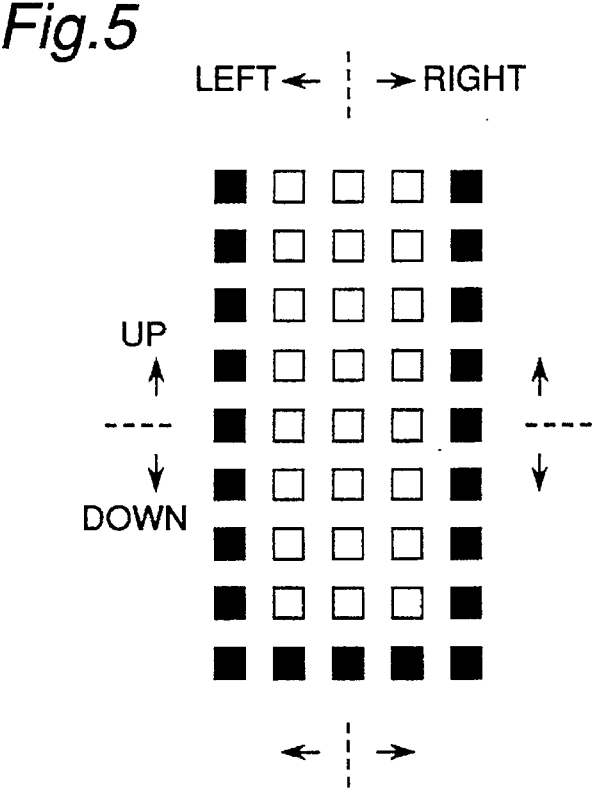
FIG. 5 is an explanatory view of an area difference, which is a feature value in the same embodiment.

The up-down area difference (feature value 5: UDDIFF), as shown in FIG. 5, is a feature value obtained by determining the difference between an area of lateral 4×longitudinal 4 black meshes in the upper half and another area of lateral 4×longitudinal 4 black meshes in the lower half. In an example of "U" in FIG. 5, the up-down area difference is determined to be 8−11=−3.

The left-right area difference (feature value 6: LRDIFF), as shown in FIG. 5, is a feature value obtained by determining the difference between an area of lateral 2×longitudinal 9 black meshes in the left half and another area of lateral 2×longitudinal 9 black meshes in the right half. In the example of "U" in FIG. 5, the left-right area difference is determined to be 10−10=0.

Figure 6:
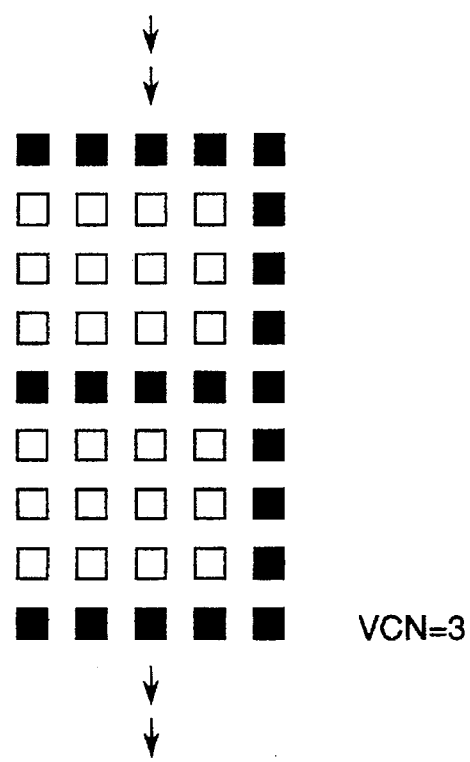
FIG. 6 is an explanatory view of a vertical cross number, which is a feature value in the same embodiment.

The vertical cross number (feature value 7: VCN), as shown in FIG. 6, is a feature value obtained by determining the number of times of crossing with black meshes counted along the center of columns top to bottom. In an example of "3" in FIG. 6, the vertical cross number is determined to be 3.

Figure 7:
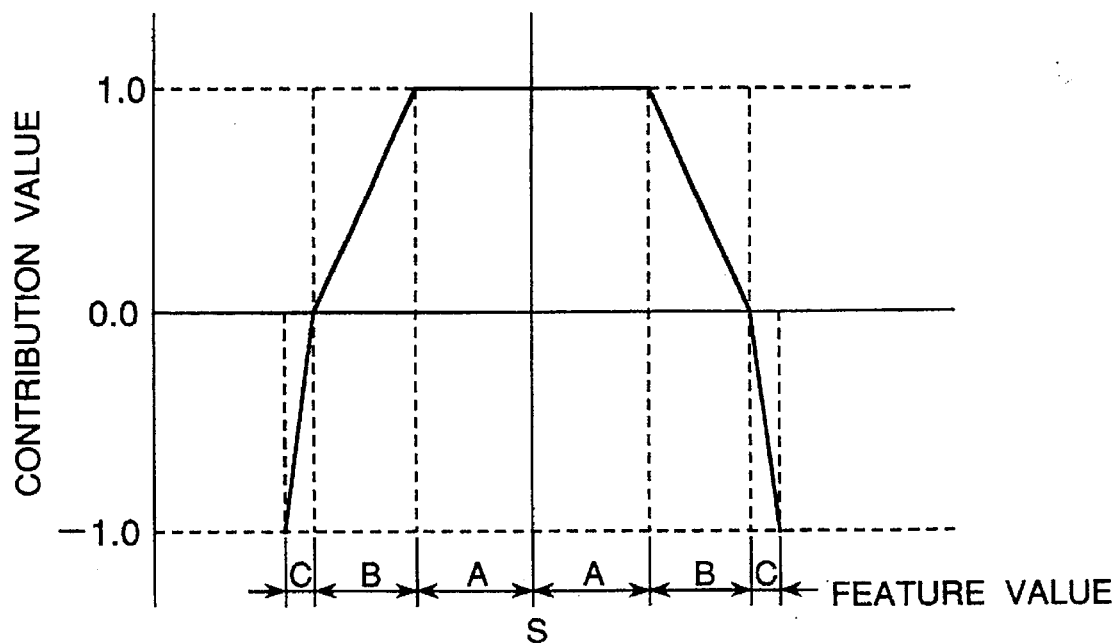
FIG. 7 is an explanatory view of a membership function in the embodiment.
Figure 8:
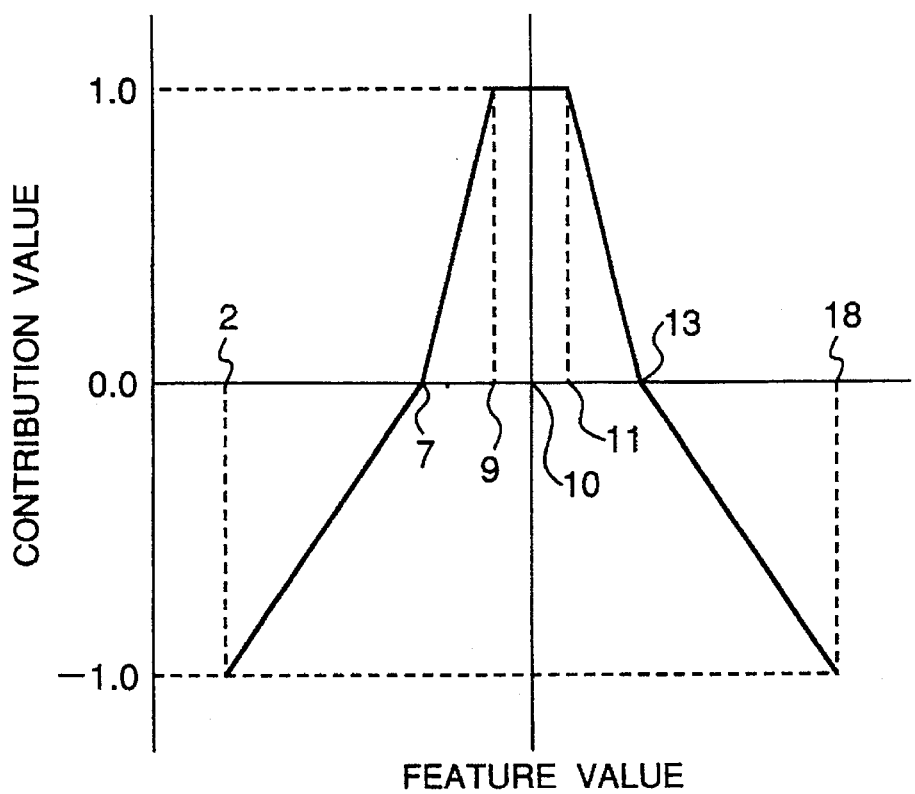
FIG. 8 is an explanatory view of an example of the membership function in the same embodiment.

The feature values j determined by the feature value extraction circuit 1 are inputted to a membership function extraction circuit 2, from which a membership function k is outputted. The membership function refers to an input/output function having a certain spread around the feature value of standard mesh pattern data (hereinafter, referred to as reference feature value). The membership function receives an input of a feature value j of mesh pattern data to be decided, and delivers an output of a contribution value with which a shift from the reference feature value is evaluated. In this case, assuming that a maximum value 1.0 is delivered as an output when a reference feature value is an input, the membership function is created so as to spread around the maximum value. FIG. 7 shows the membership function, where the feature value is plotted along the horizontal axis and the contribution value is plotted along the vertical axis. In the example of FIG. 7, the membership function is so formed that a reference feature value S is adjoined to a width A by an interval in which a contribution value 1.0 is outputted, which in turn is adjoined to a width B by an interval in which contribution values of 0.0 to 1.0 are outputted, which is further adjoined to a width C by an interval in which contribution values of −1.0 to 0.0 are outputted. It is noted that the widths A, B, and C are to be set experimentally in view of overlaps with feature values of other standard mesh pattern data. For example, if the same reference feature value of characters is around 0 to 30, appropriate settings would be width A=1, width B=2, and width C=5 or so. FIG. 8 shows a membership function in a case where the reference feature value S=10, width A=1, width B=2, and width C=5.

Next described is the decision method, with reference to FIG. 2. In this method, a decision is made through steps of determining feature values necessary for character decision, comparing the resulting feature values with a membership function to determine contribution values, and finally determining a total contribution value.

Figure 9:
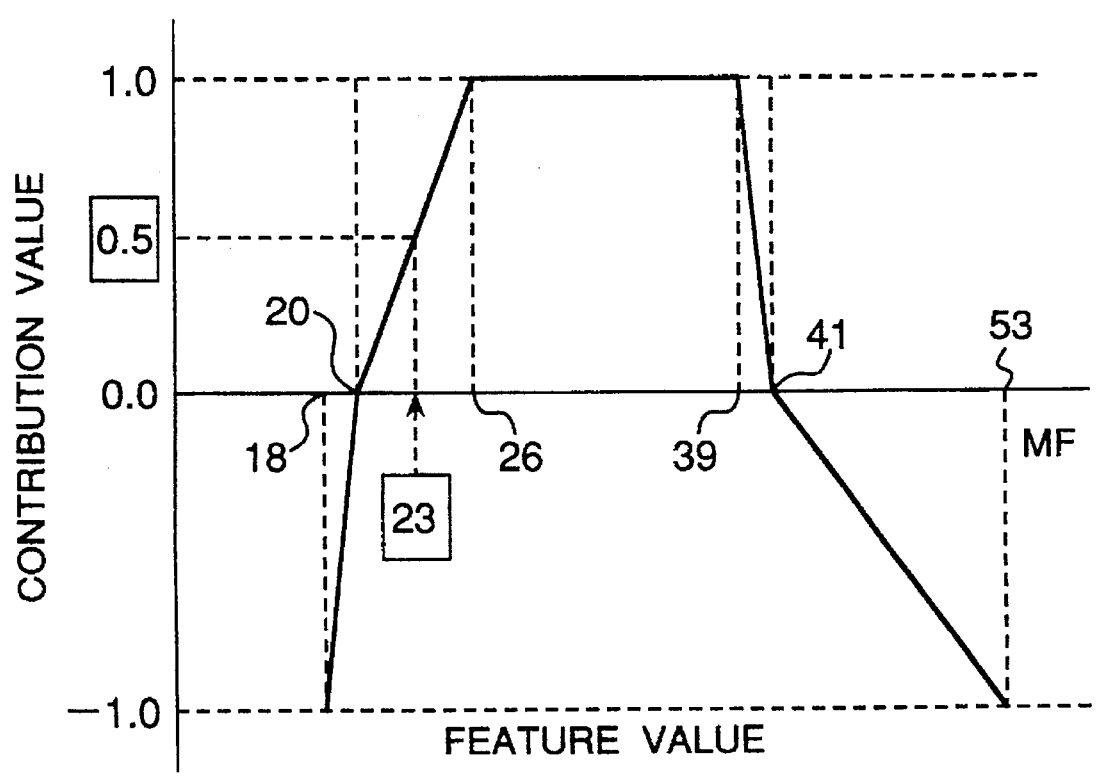
FIG. 9 is an explanatory view of how to determine the contribution value in the same embodiment.

Mesh pattern data f to be decided is inputted to a feature value extraction circuit 3, from which necessary feature values j are extracted. In this embodiment, used in correspondence to the previously determined reference feature values are the vertical structure vector sum 1, the vertical structure vector sum 2, the horizontal structure vector sum 1, the horizontal structure vector sum 2, the up-down area difference, the left-right area difference, and the vertical cross number. A feature value j is inputted to a membership function comparison circuit 4, from which a contribution vector 1 is outputted. This operation is effected similarly for the seven feature values adopted here. FIG. 9 shows how to determine a contribution value, where a contribution value (0.5) is obtained as an output for an inputted feature value (23).

Figure 10:
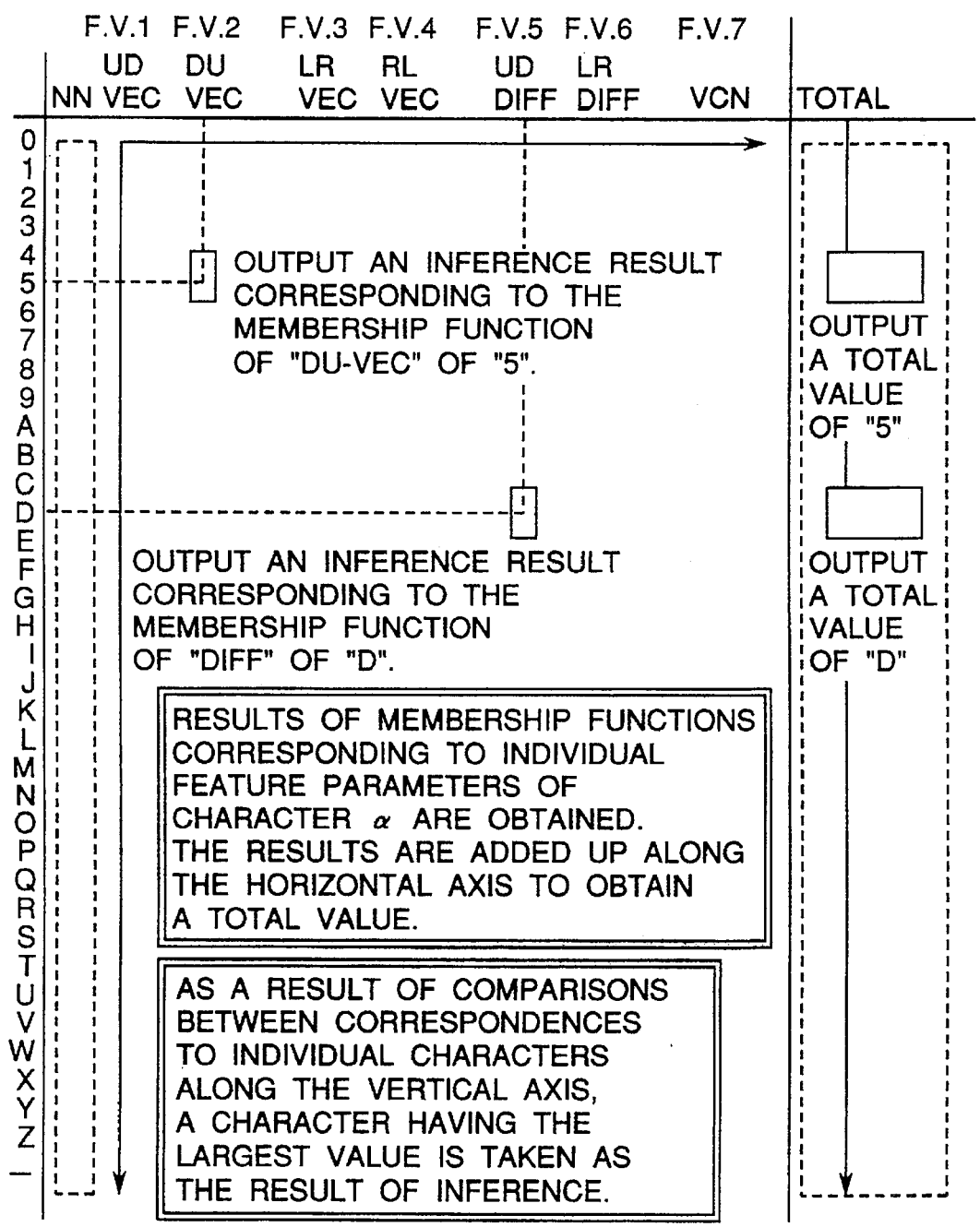
FIG. 10 is an explanatory view of a fuzzy inference method in the same embodiment.

A contribution value summing-up circuit 5 receives an input of the contribution values 1 and delivers an output of a total contribution value m. FIG. 10 illustrates the fuzzy inference method. Contribution values of the characters to the membership function are determined with respect to the seven feature values, a total contribution value is determined along the horizontal axis for each character, and finally a character having the largest total contribution value is taken as a decision result.

Next described is an example in which the above decision process is applied to actual mesh pattern data.

Figure 20:
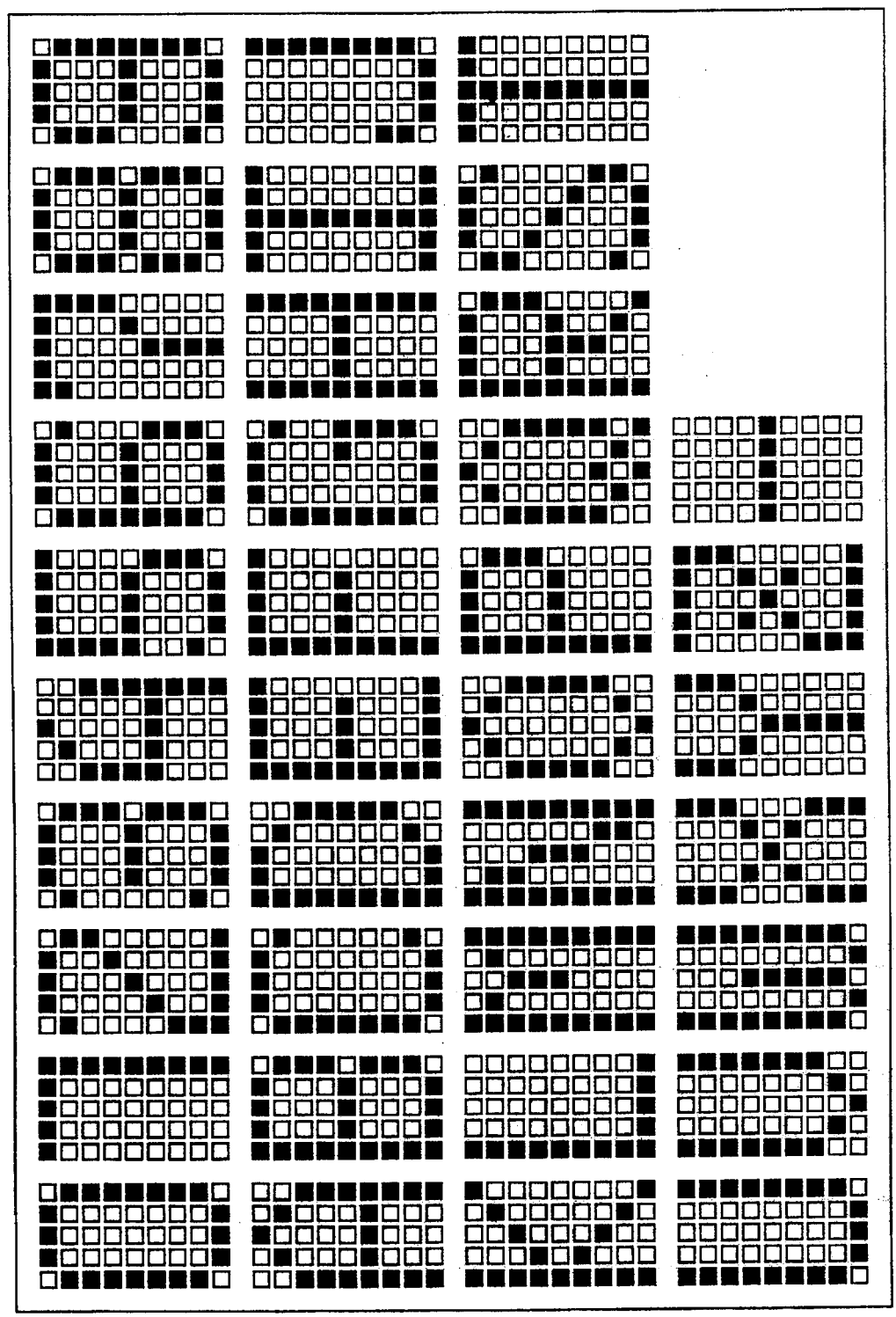
FIG. 20 is an explanatory view of standard pattern data.
Figure 21:
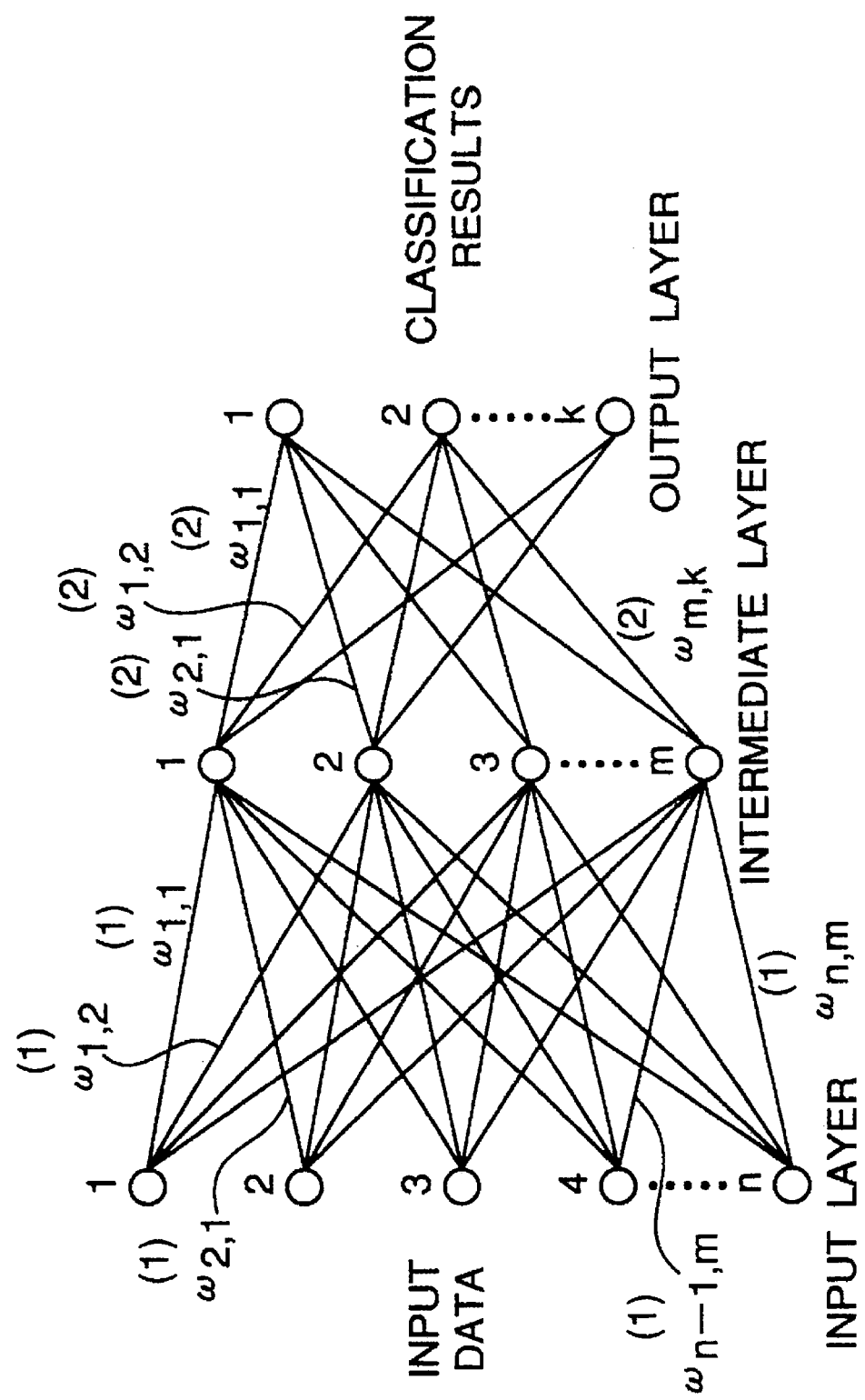
FIG. 21 is an explanatory view of the neural network organization.
Figure 22:
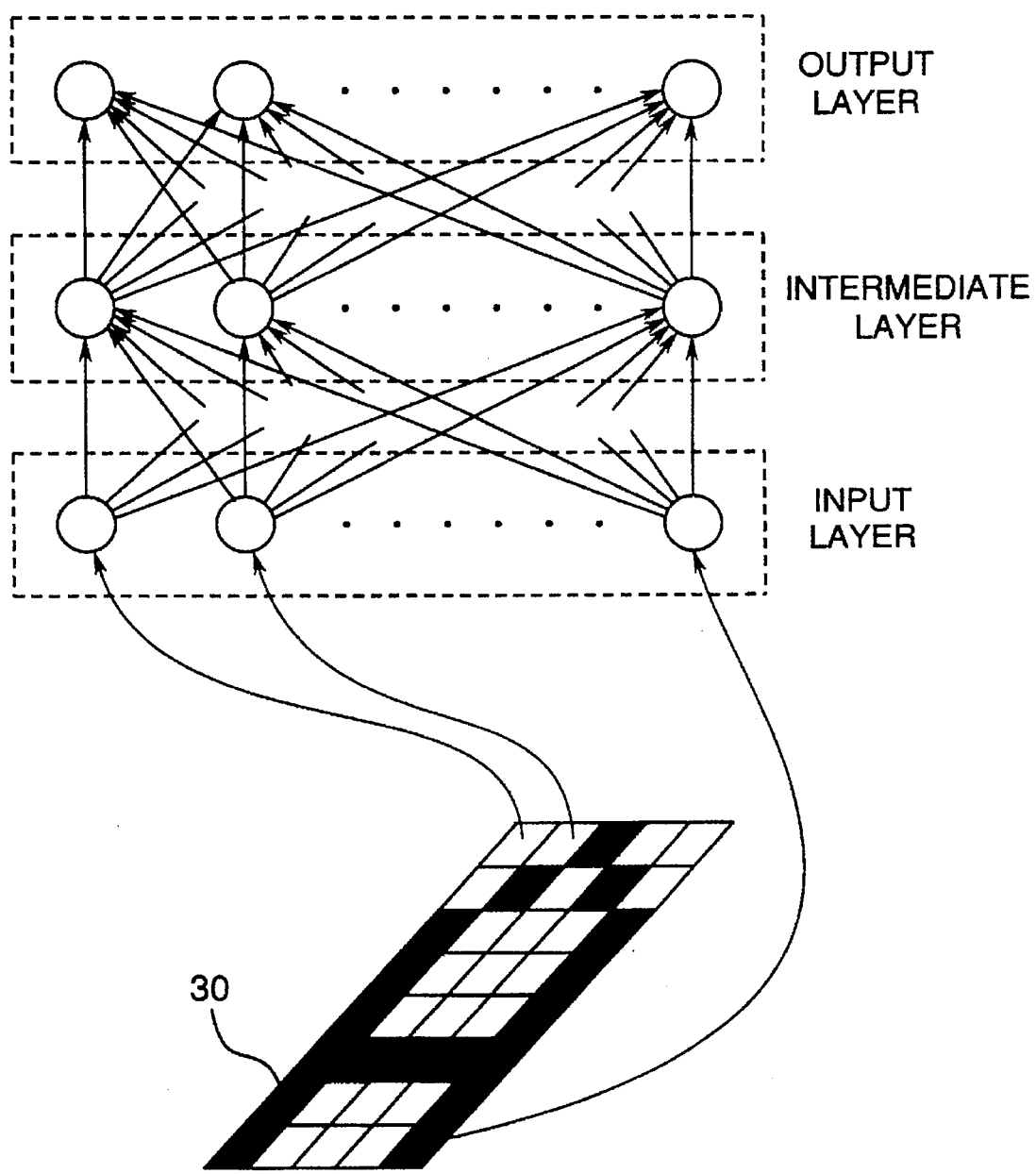
FIG. 22 is an explanatory view of reaction at the time when data is inputted to the neural network.
Figure 23:
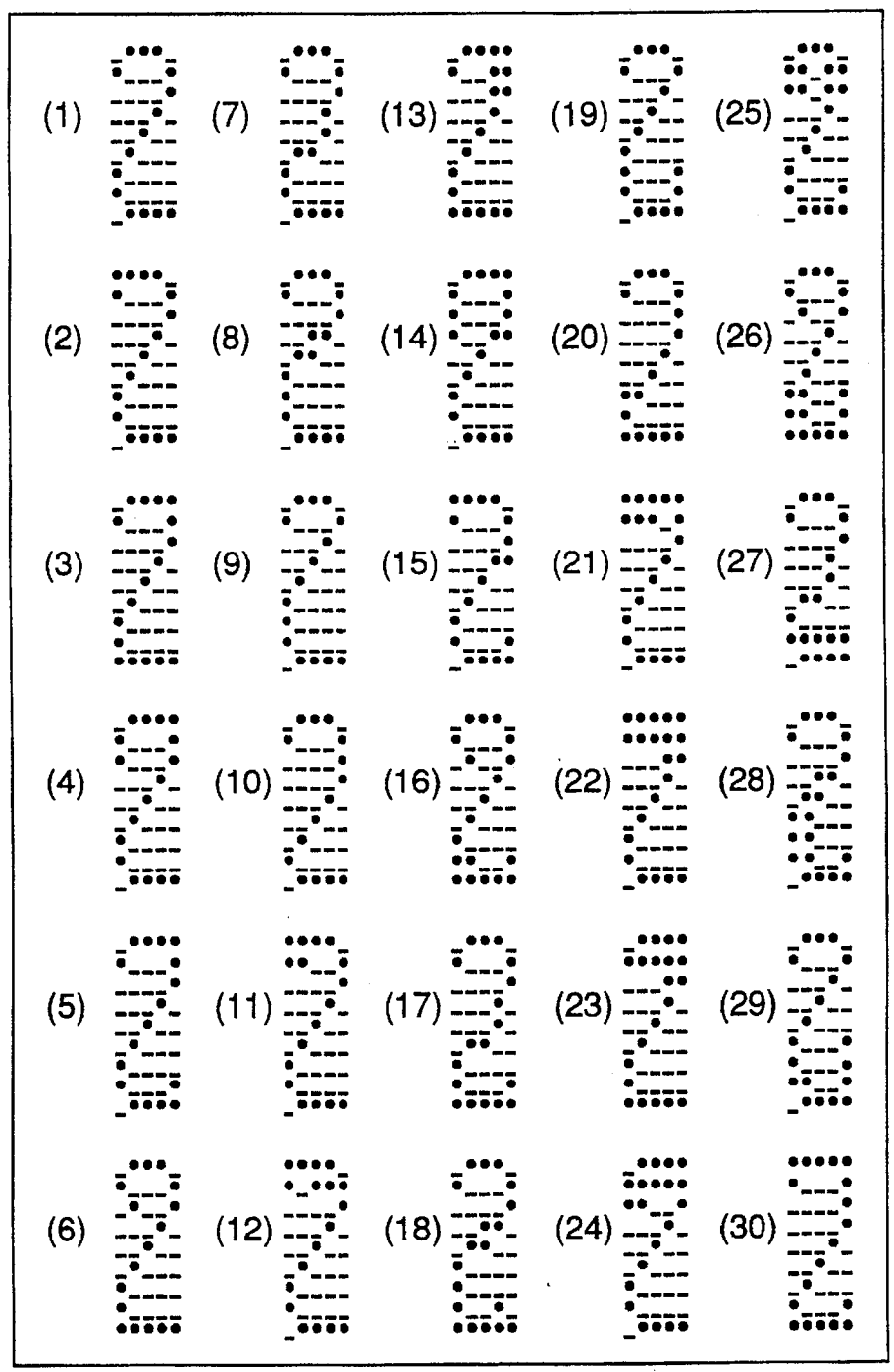
FIG. 23 is an explanatory view of character data for use of decisive test when the decision object is "2"
Figure 24:
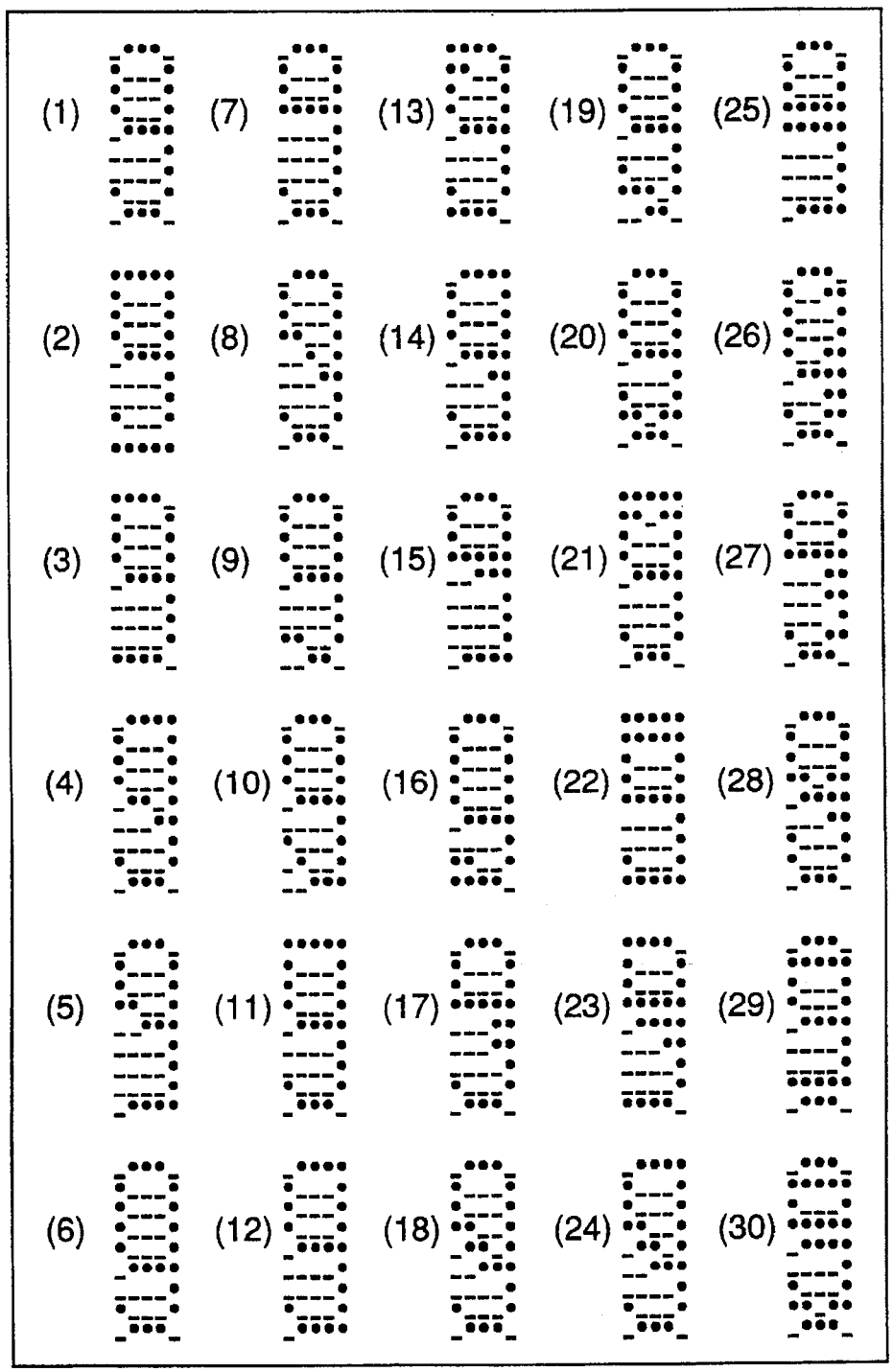
FIG. 24 is an explanatory view of character data for use of decisive test when the decision object is "9"
Figure 25:
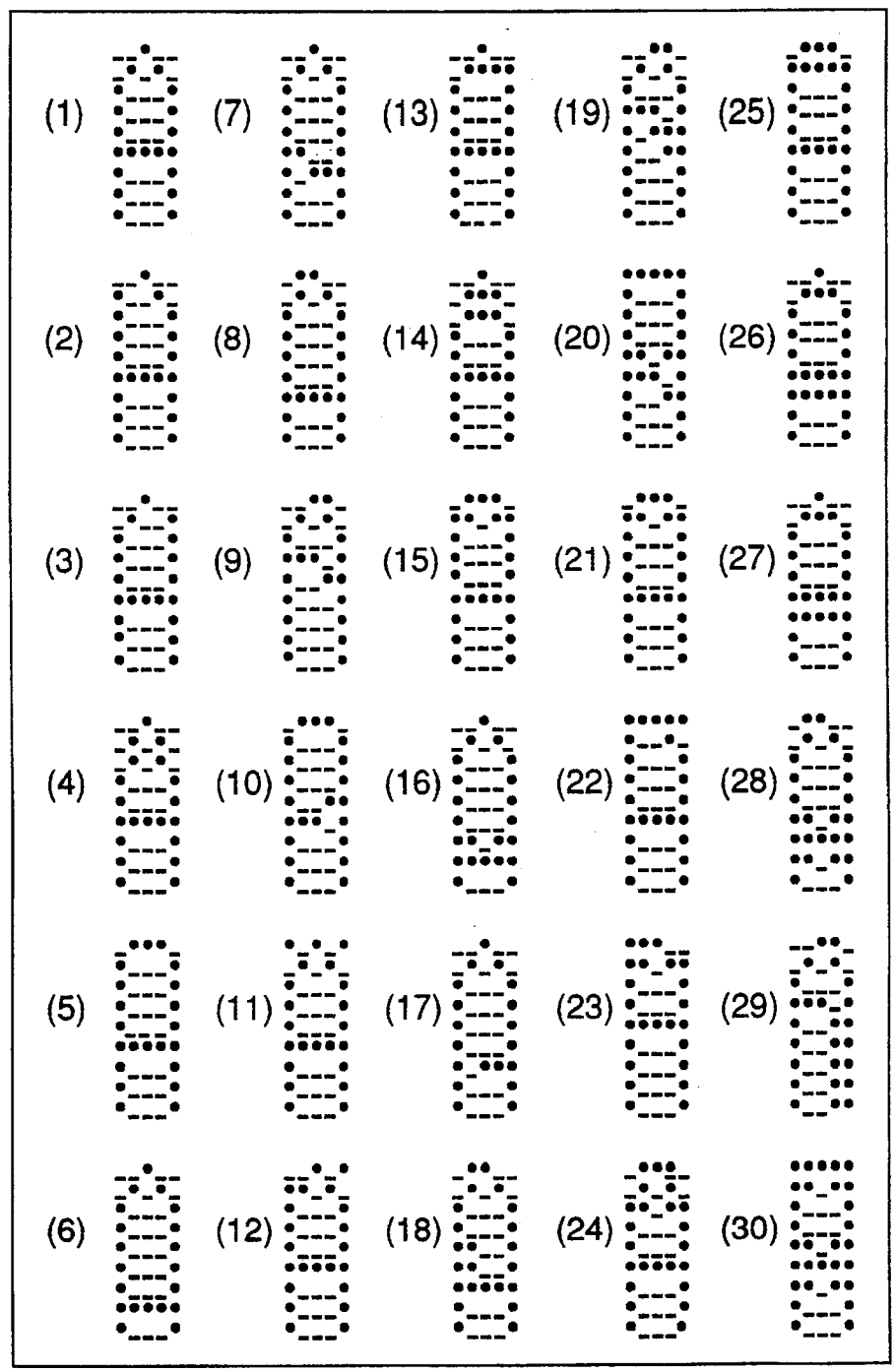
FIG. 25 is an explanatory view of character data for use of decisive test when the decision object is "A"
Figure 26:
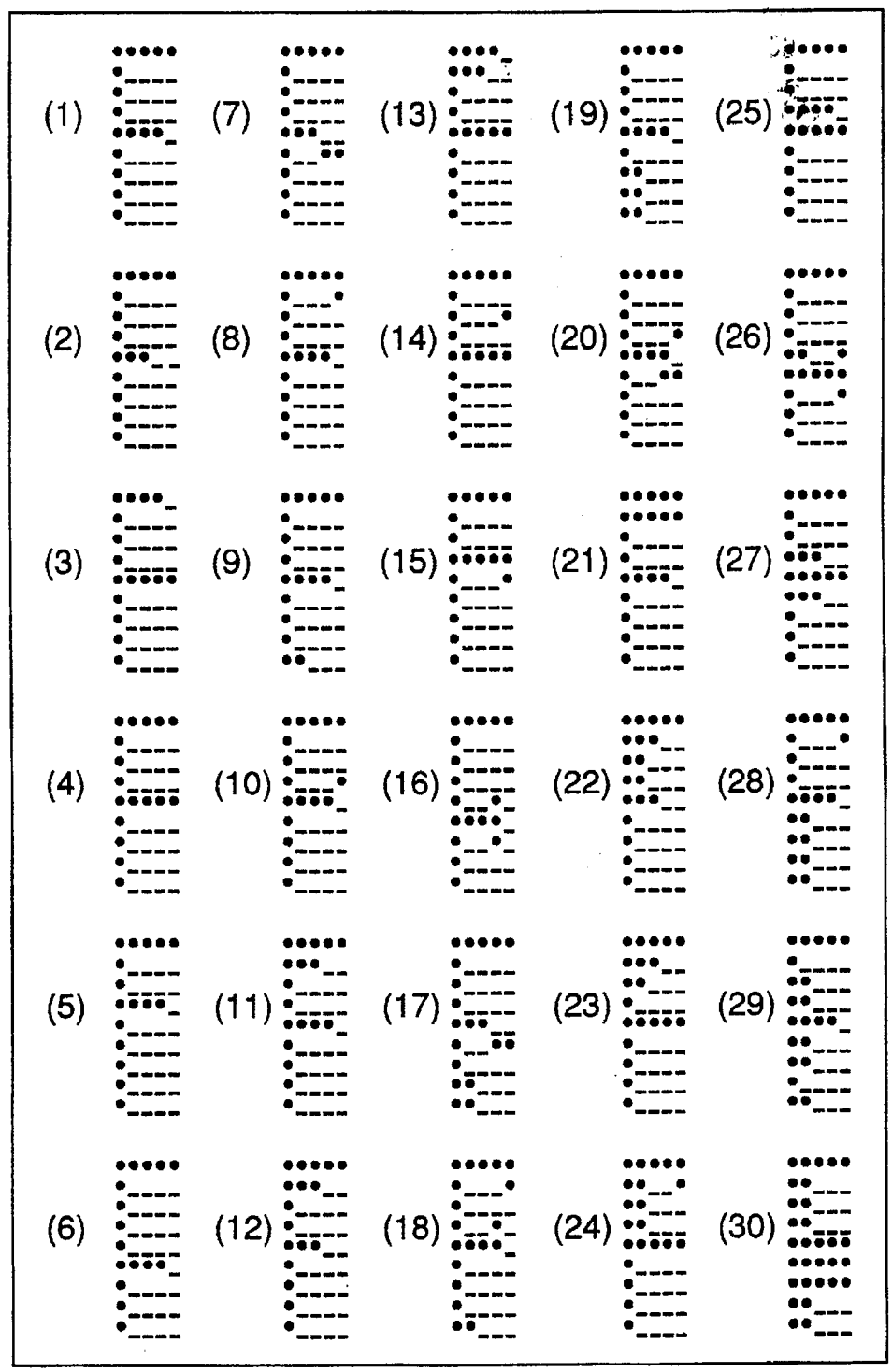
FIG. 26 is an explanatory view of character data for use of decisive test when the decision object is "F"

For the standard mesh pattern data as shown in FIG. 20, the reference feature values are calculated as shown in FIG. 11A. Then, membership functions are created with the settings of width A=1, width B=2, and width C=5 for the feature values 1 to 6, and with the settings of width A=0, width B=1, and width C=1 for the feature value 7. Thus, the learning is completed.

Next, the decision process is described with reference to FIG. 12. A mesh pattern 10, which is the object of the decision, is shown in FIG. 12A, while FIG. 12B shows contribution values to the membership function of the individual feature values and total contribution values for the individual characters, with respect to the individual characters. In FIG. 12A, "1"s denote black meshes and "0"s denote white meshes. Determining the feature values of the object pattern 10 results in a feature value 1 (UDVEC) of 1+0+0+0+0=1, a feature value 2 (DUVEC) of 0+0+0+0+0=0, a feature value 3 (LRVEC) of 1+0+4+3+2+1+0+0+0=11, a feature value 4 (RLVEC) of 0+0+0+1+2+3+4+4+0=14, a feature value 5 (UDDIFF) of 8−8=0, a feature value 6 (LRDIFF) of 7−7=0, and a feature value 7 (VCN) of 3. The steps of determining contribution values of these feature values and determining their total contribution values are carried out with respect to the individual characters. However, the characters are exemplified only by "2", "3", "C", "E", "T", "S", and "Z", and the other characters are omitted in the figure, for simplicity. Total contribution values for the individual characters are 7.00 for "2", 1.30 for "3", 0.10 for "C", 1.20 for "E", 4.00 for "T", 6.00 for "S", and 6.50 for "Z". Thus, the object pattern 10 is determined to be the "2" having the largest contribution value.

In these processes, the decision ability can be improved by adding or changing feature values suitably for the character decision. Also, the simplicity of processing allows the number of feature values to be increased to quite a large extent without causing problems.

Next described is an attribute decision method according to a second embodiment of the present invention. In this embodiment, a decision process by the aforementioned fuzzy inference is performed after the processing using an NN is preliminarily performed. That is, the NN-involving decision method, although unfavorable for high-accuracy decision as described above, is a simple, good method for coarse decision because values of neurons of an output layer corresponding to the character of correct response fall within the highest three in most cases of character decision. In the present embodiment, after a character is previously selected by NN processing, a decision with the fuzzy inference is executed.

Figure 13:
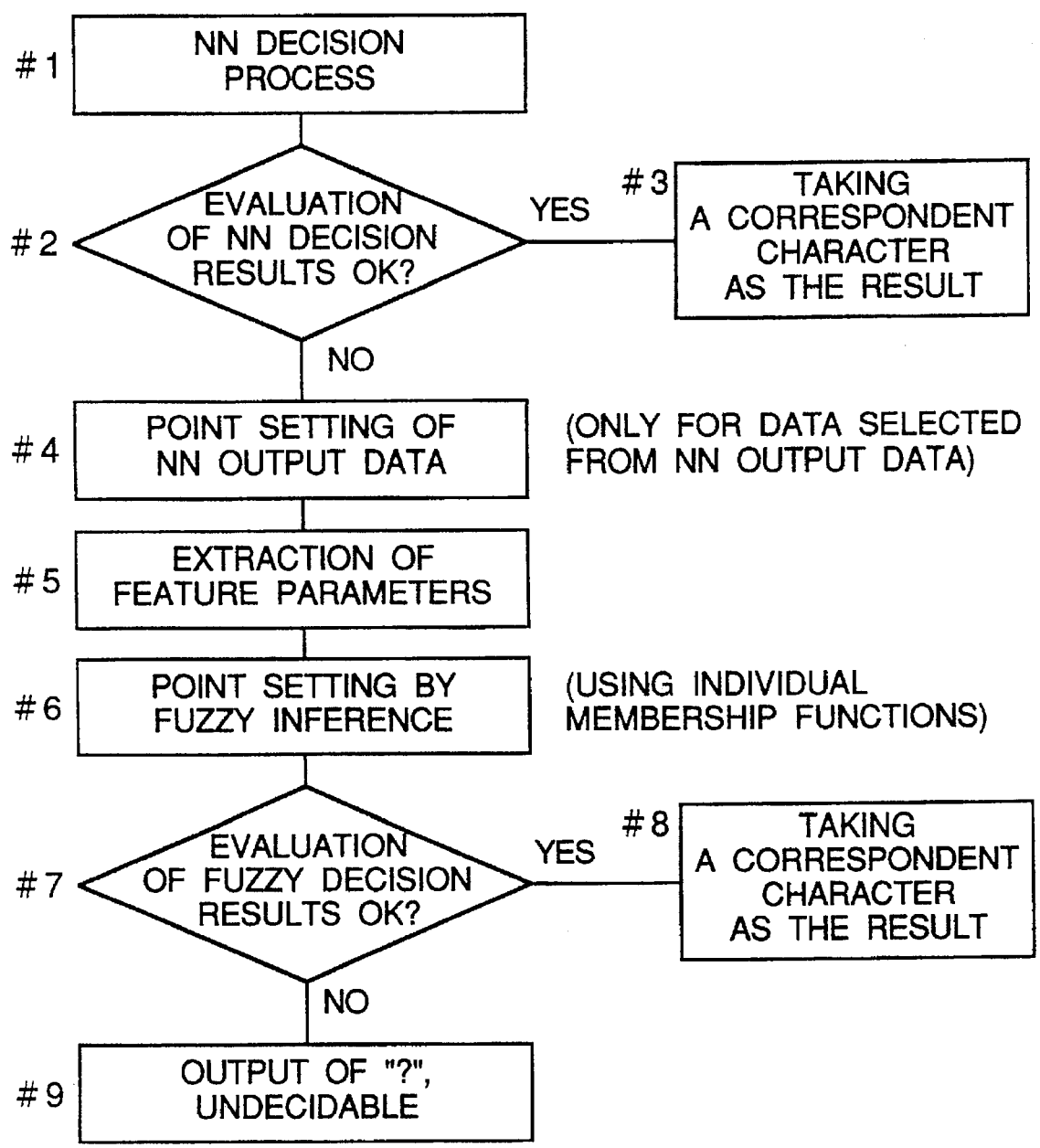
FIG. 13 is a flow chart of processing in an attribute decision method of another embodiment of the present invention.
Figure 15:
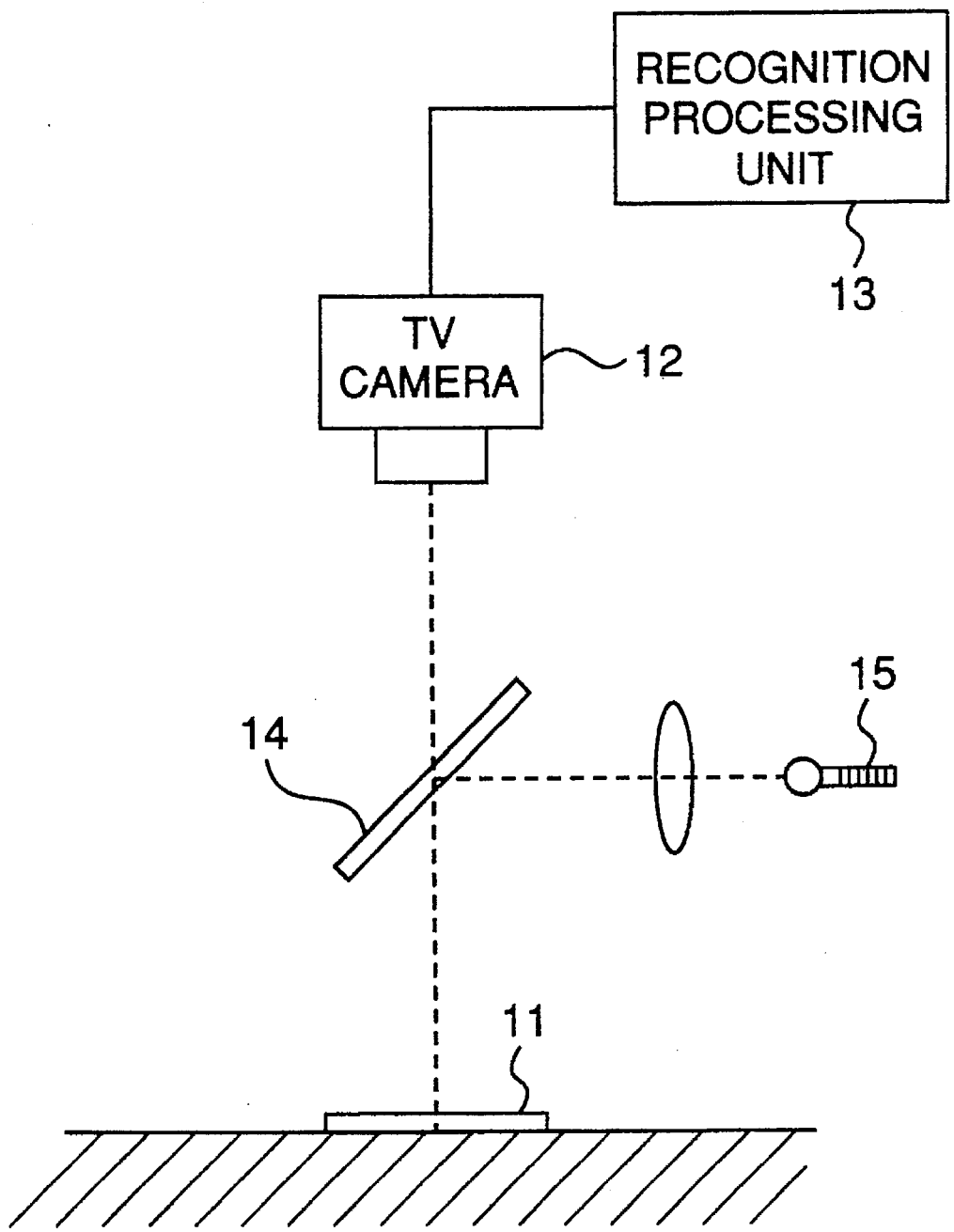
FIG. 15 is an outlined arrangement view of a character recognition device.
Figure 16:
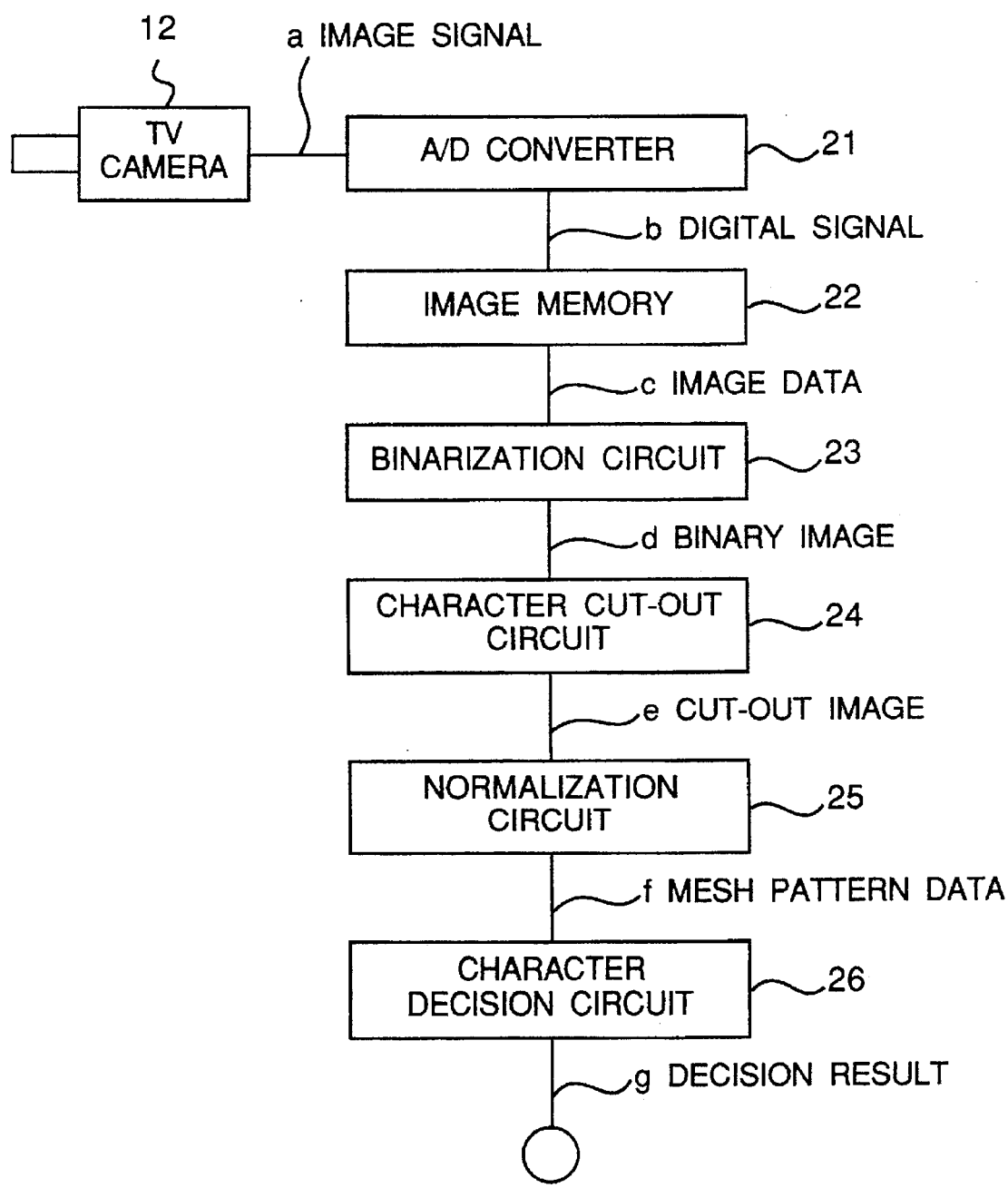
FIG. 16 is an arrangement view of the image processing section of a conventional character recognition device.
Figure 17:
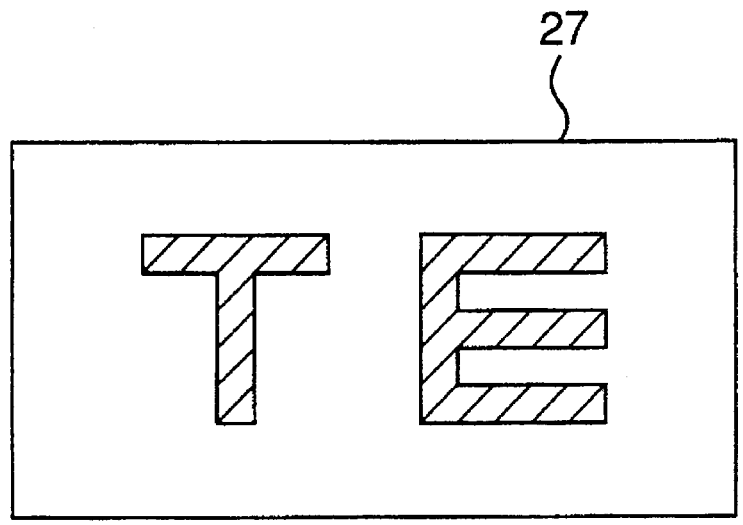
FIG. 17 is an explanatory view of a binarized image.
Figure 18:
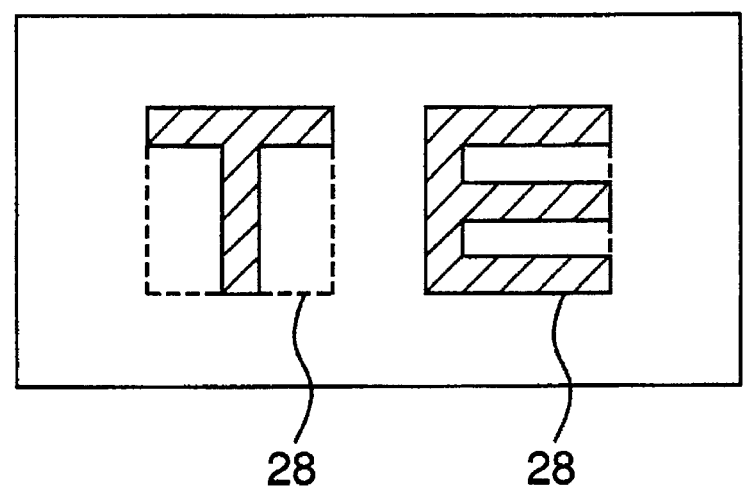
FIG. 18 is an explanatory view of an image with characters cut out.
Figure 19:
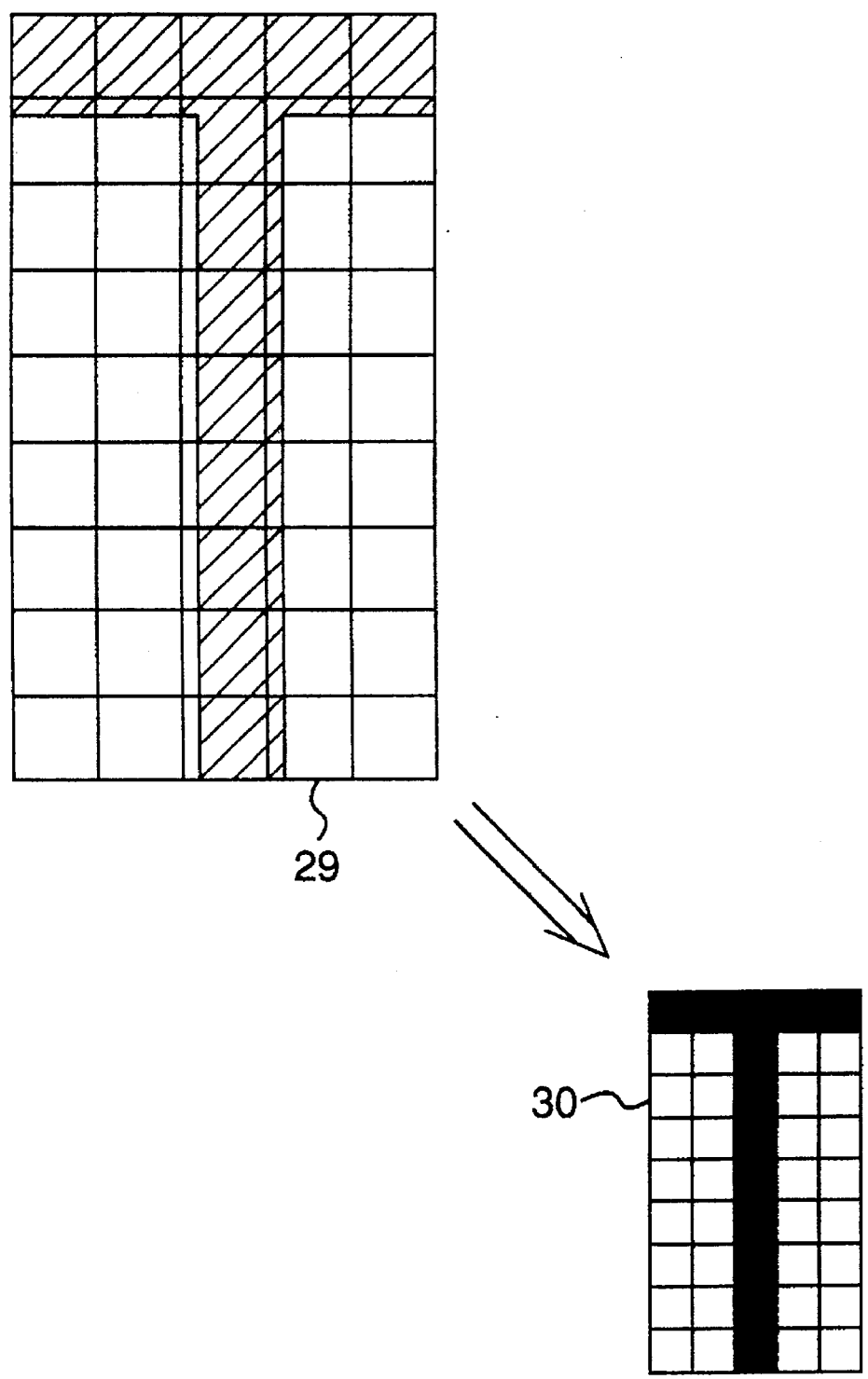
FIG. 19 is an explanatory view of the transformation into mesh pattern data.

FIG. 13 shows the flow of the character decision. The processes up to the stage at which mesh pattern data is prepared are carried out in the same way as in the foregoing embodiment. At step #1, an NN decision process is performed in the similar way as in the conventional example. Next, at step #2, if the NN decision result is equal to or above a first decision threshold, then a correspondent character is taken as the result at step #3. If it is below the first decision threshold, the program flow goes to the fuzzy inference, where those having rather larger values to a certain amount as a result of the NN decision are processed by the fuzzy inference. In this way, at step #4, point setting of NN output data is done for only data selected out of the NN output data. At step #5, extraction of feature values is done for only the selected data (characters). At step #6, point setting is done by the fuzzy inference from each membership function. That is, the point setting is made by adding the output values of the feature values to each other for each standard pattern of the selected characters as to obtain a total value. At step #7, if the result of the fuzzy inference decision is equal to or above a second decision threshold which is experimentally determined, a correspondent character is taken as the result at step #8. If it is below the second decision threshold, it is taken as undecidable at step #9.

Now an example in which the decision method is applied to actual pattern data is described. With respect to the standard mesh patterns as shown in FIG. 20, a mesh pattern 10, which is the object of decision, is shown in FIG. 14A, while FIG. 14B shows NN output data, contribution values to the membership functions of the individual feature values, and total contribution values of the individual characters, for each of the selected characters. First, at step #1, an NN decision process is performed in the similar way as in the conventional example. Characters having NN output data of 0.01 or more are selected at step #2 which are characters "2" of NN output data of 0.671, "3" of 0.056, "C" of 0.017, "E" of 0.055, "T" of 0.021, "S" of 0.015, and "Z" of 0.201, and after multiplied by ten, left at step #4. At step #5, extraction of feature values is done for only the selected characters, that is, "2", "3", "C", "E", "T", "S", and "Z". At step #6, the point setting is done by the fuzzy inference from each membership function. That is, the output values of the feature values are added to each other for each standard pattern of the selected characters as to obtain a total value. In the character "2", total value=NN+UDVEC+DUVEC+LRVEC+RLVEC+ UDDIFF+LRDIFF+VCN=6.71+1.00+1.00+1.00+1.00+ 1.00+1.00+1.00=13.70. In a similar manner, the total values of the characters "3", "C", "E", "T", "S", and "Z" are obtained as shown in FIG. 14B. At step #7, the result of the fuzzy inference decision is compared with a second decision threshold which is 10, a correspondent character "2" is taken as the result at step #8. Finally, the mesh pattern is decided to be the character "2" having the largest total contribution value.

In the embodiment, the vertical structure vector sum 1 is effective for distinguishing character "4" from "7" and character "P" from "R". The vertical structure vector sum 2 is effective for distinguishing character "4" from "5" and character "E" from "F". The horizontal structure vector sum 1 is effective for distinguishing character "8" from "9" and character "G" from "S". The horizontal structure vector sum 2 is effective for distinguishing character "6" from "8" and character "P" from "R". The up-down area difference is effective for distinguishing character "6" from "9" and character "X" from "Y". The left-right area difference is effective for distinguishing character "3" from "9" and character "C" from "D". The vertical cross number is effective for distinguishing character "0" from "8" and character "S" from "X". Therefore, depending on the characters to be distinguished, the necessary ones of the feature values can be selected.

Figure 27:
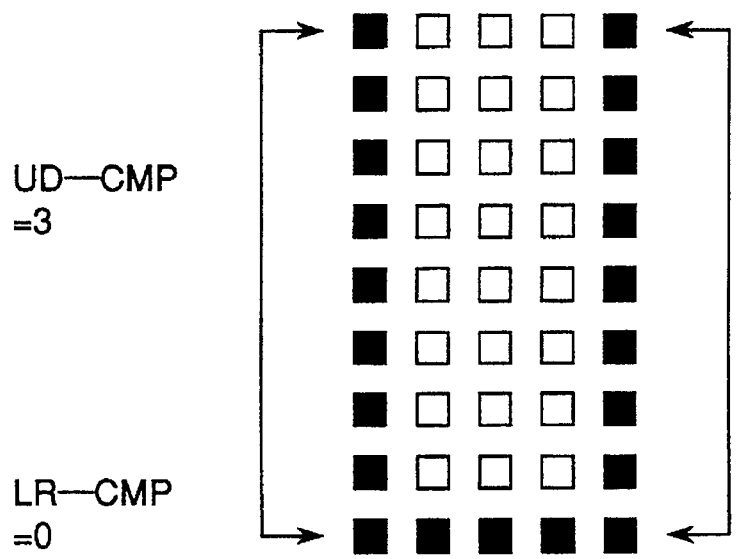
FIG. 27 is an explanatory view of a sum of comparative difference between corresponding upper and lower parts, which is a feature value in the embodiment.
Figure 28:
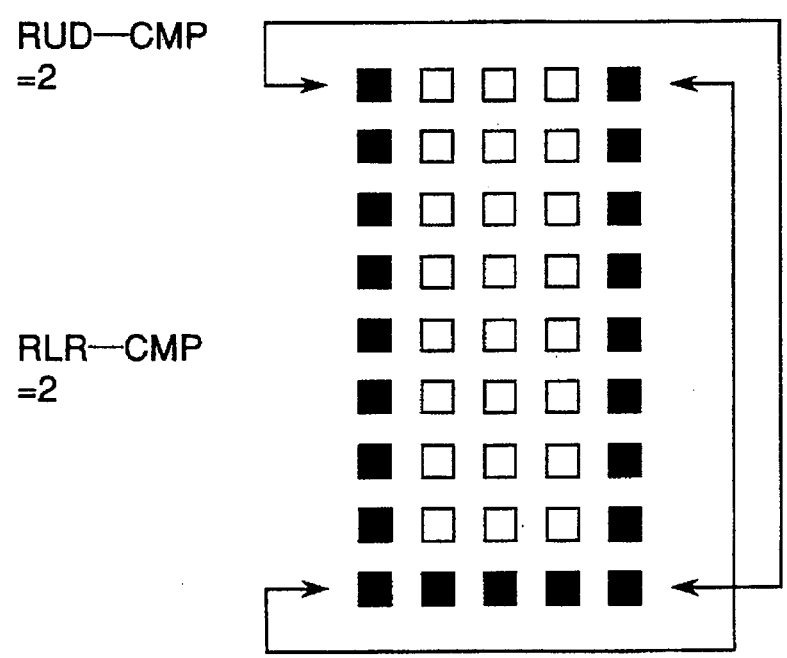
FIG. 28 is an explanatory view of a sum of comparative difference between diagonally corresponding upper and lower parts, which is a feature value in the embodiment.
Figure 29:
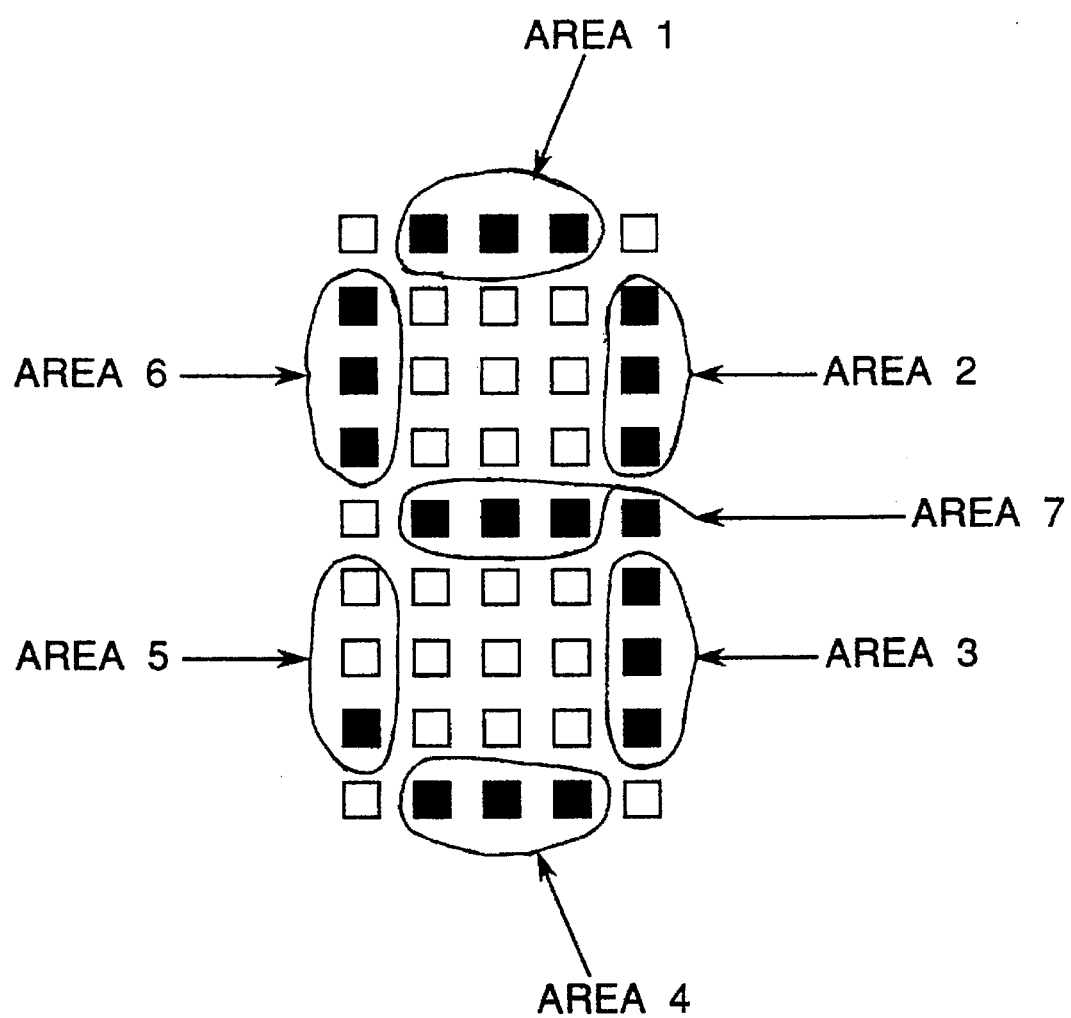
FIG. 29 is an explanatory view of area sums AREA 1 to AREA 7 of predetermined parts, which is feature values in the embodiment.

In an actual application example, totally 26 feature values are selected with proper feature values added to the aforementioned seven feature values. That is, additional feature values are as follows. A vertical structure vector difference (SUB-VEC 1) as a feature value 8 is obtained by calculating the difference between the vertical structure vector sums 1 and 2. A horizontal structure vector difference (SUB-VEC 2) as a feature value 9 is obtained by calculating the difference between the horizontal structure vector sums 1 and 2. A maximum up-down vector (UD-MAX) as a feature value 10 is obtained by calculating the maximum vector value from top to bottom for each column. A maximum down-up vector (DU-MAX) as a feature value 11 is obtained by calculating the maximum vector value from bottom to top for each column. A maximum upper left-right vector (ULR-MAX) as a feature value 12 is obtained by calculating the maximum vector value from left to right for each row in the upper part. A maximum lower left-right vector (DLR-MAX) as a feature value 13 is obtained by calculating the maximum vector value from left to right for each row in the lower part. A maximum upper right-left vector (URL-MAX) as a feature value 14 is obtained by calculating the maximum vector value from right to left for each row in the upper part. A maximum lower right-left vector (DRL-MAX) as a feature value 15 is obtained by calculating the maximum vector value from right to left for each row in the lower part. A sum (UD-CMP) of comparative difference between corresponding upper and lower parts as a feature value 16 is obtained by calculating the difference between the corresponding upper and lower parts to obtain an up-down symmetry, as shown by arrows in FIG. 27 wherein UD-CMP=3. A sum (LR-CMP) of comparative difference between corresponding left and right parts as a feature value 17 is obtained by calculating the difference between the corresponding left and right parts to obtain a left-right symmetry. In the mesh data of FIG. 27, LR-CMP=0. A sum (RUD-CMP) of comparative difference between diagonally corresponding upper and lower parts as a feature value 18 is obtained by calculating the difference between the diagonally corresponding upper and lower parts to obtain a diagonal up-down symmetry, as shown by arrows in FIG. 28 wherein RUD-CMP=2. A sum (RLR-CMP) of comparative difference between diagonally corresponding left and right parts as a feature value 19 is obtained by calculating the difference between the diagonally corresponding left and right parts to obtain a diagonal left-right symmetry. In the mesh data of FIG. 28, RLR-CMP=2. Area sums AREA 1 to AREA 7 of predetermined parts as feature values 20 to 26 are obtained by calculating area sums of predetermined parts composed of three meshes as shown in FIG. 29. In the mesh data of FIG. 29, AREA 1=3, AREA 2=3, AREA 3=3, AREA 4=3, AREA 5=1, AREA 6=3, and AREA 7=3. FIGS. 11B, 11C, and 11D are views showing the reference feature values 8 to 26 corresponding to standard mesh pattern data.

In an actual application example in which totally 26 feature values are selected with the above proper feature values added to the aforementioned seven feature values, and applied to the decisions of 120 character patterns as shown in FIGS. 23 to 26, the results are shown in FIG. 30. In the actual application example, object characters "2", "9", "A", and "F" are used and the number of example patterns is 30. The evaluation reference is as follows.

In a case of only NN, (1) if the evaluation value of the NN is 0.7 or more, the response is correct, and (2) if the evaluation value of the NN is 0.4 or more and the difference between the first highest evaluation value and the second highest evaluation value is 0.3 or more, the response is correct.

In a case of NN and FUZZY, (1) if the evaluation value of the NN is 0.7 or more, the response is correct; and (2) if the evaluation value of the NN is 0.6 or more and the difference between the first highest evaluation value and the second highest evaluation value is 0.5 or more, the response is correct; (3) if the first highest evaluation values of the only NN case and the NN and FUZZY case are the same and the difference between the first and second highest evaluation values of the NN and FUZZY is 3.0 or more, the response is correct; and (4) if the first highest evaluation values of the only NN case and the NN and FUZZY case are different from each other and the evaluation values of the NN and FUZZY and only FUZZY are the first highest evaluation values and the difference between the first and second highest evaluation values of the NN and FUZZY is 3.0 or more, the response is correct.

Nevertheless the first highest evaluation value is wrong, when the response is correct based on the above evaluation reference, the response is wrong and otherwise is taken as "?", undecidable.

As shown in FIG. 30, the results were $108/120$ (90%) of correct responses, $1/120$ (1%) of erroneous responses, and $11/120$ (9%) of undecidable responses. These results, as compared with the decision by NN alone, show reductions to $1/5$ of erroneous responses, and to $1/3$ of undecidable responses. Taking into consideration that character patterns difficult even for man to decide are also included in the actual application example, the decision ability has been improved to a substantial extent, compared with the prior art.

The above embodiments have been described upon the character recognition. However, the method of the present invention may of course be applied to a wide variety such as recognition of shapes of rectangle, triangle, circle, star or etc. without being limited to character recognition, if it comprises the steps of selecting feature values effective to the attributes that should be discriminated, forming a membership function, and performing the fuzzy inference. Also, although the mesh data has been treated as being composed of binary data in the above embodiments, the method of the invention may also be applied to other types of mesh data if effective feature values can be selected from the gray level values out of the mesh data. Further, although the feature values have been extracted from normalized mesh data in the above embodiments, the mesh data does not need to be normalized if effective feature values can be selected from data prior to normalization. Still, although the contribution values have been limited to a range of −1.0 to 1.0, it is not limited to this. Neither limited is the number of feature values. The decision threshold to be combined with the NN may also be set appropriately. Furthermore, although the NN output data has been added at the time of decision by fuzzy inference in the above embodiments, it may also be arranged that the NN is effected for only character selection and the NN output data is not considered in the fuzzy inference. Also, even in considering the NN output data, its multiplier factor may be arbitrarily set according to the decision object.

The input pattern, which comes as an object of the present invention, is not limited to patterns obtained from images that are picked up by a TV camera out of characters, symbols, patterns, and the like on the object, such as identification numbers on semiconductor wafers and liquid crystal panels, or serial numbers on IC chips. That is, the present invention can be applied to patterns obtained by scanning of a facsimile machine or other equipment.

According to the attribute decision method of the present invention, as apparent from the foregoing description, comparisons are made between membership functions of a plurality of pieces of feature data i.e. feature values determined from a multiplicity of standard patterns, and a plurality of pieces of feature values of an input pattern. Then, a total value of output values of the membership functions as to all the feature values is determined with respect to every standard pattern, and the attribute decision is performed by determining a standard pattern of the highest total value. Therefore, the correct response ratio of the attribute decision can be enhanced by setting the feature value appropriately, so that attribute decision of high reliability can be achieved. Also, the simplicity of processing allows the number of feature value items to be increased to quite a large extent without causing problems in the processing time, processing capacity, and the like. Further, the neural network of this method is clearer in the way of decision than the conventional neural network, allowing necessary feature value to be combined. As the resulting advantages, by adding and changing feature value, a more appropriate attribute decision can be achieved and ability improvement can also be accomplished relatively easily.

Moreover, the neural network requires no laborious work such as the selection of feature values by virtue of its black-box fashioned internal organization, and therefore is independent of whether the selection of data is proper or not.

Further, taking the neural network's advantage that it is indeed unfavorable for fine decision but effective for coarse decision, if a plurality of upper-order standard patterns are previously selected by determining standard patterns of high similarity with the use of the neural network, and a decision is made by the above method by using the selected standard patterns, then high reliability decision can be achieved with less burden of data processing and moreover the selection of feature value can be simplified, as further advantages.

Also, when decision by the neural network is used previously, even higher reliability decision may be achieved if output values of the neural network are taken into account for attribute decision.

It also becomes possible to discriminate similar patterns and thereby achieve high-accuracy decision, by setting the membership function so that it outputs the highest value when a feature value of a standard pattern is inputted, and outputs lower values for feature values before and after the foregoing feature value.

It is further possible to determine characters with a high rate of correct responses by properly identifying the features of the characters with a mesh pattern used as the input pattern and with the up-and-down vertical structure vector sum, left-and-right horizontal structure vector sum, up-down and left-right area differences, and vertical cross number used as the values data for character decision.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An attribute decision method comprising steps of:
    making a comparison between at least one feature value, selected from seven feature values, of an input pattern contained in an input image and membership functions determined from 37 standard patterns including alpha-numeric characters of "0" to "9" and "A" to "Z" and a hyphen of "-" with respect to the at least one selected feature value and then obtaining output values of the membership functions for the individual standard patterns with respect to the input pattern,
    the seven feature values being, when the input pattern is a mesh pattern, vertical structure vector sums which are obtained by determining a number of white meshes counted along each column top to bottom and bottom to top until a first black mesh is encountered in data of the mesh pattern and by summing up their results,
    horizontal structure vector sums which are obtained by determining a number of white meshes counted along each row left to right and right to left until a first black mesh is encountered in the data of the mesh pattern and by summing up their results,
    up-down and left-right area differences which are obtained by determining differences in areas of black meshes between upper and lower halves and between left and right halves in the data of the mesh pattern, and
    a vertical cross number which is obtained by determining a number of times of crossing with black meshes counted along a center of columns in a vertical direction;
    calculating a total value of the output value for the at least one feature value for each of the standard patterns; and
    determining a standard pattern of the highest total value among the calculated total values and thus deciding one of the standard patterns which has the highest similarity to the input pattern.

2. The attribute decision method as claimed in claim 1, further comprising, before the comparison making step, steps of:
    previously deciding one of the standard patterns which has the highest similarity by using a neural network with respect to the input pattern contained in the input image; and selecting a plurality of upper-order standard patterns by comparing results of the preceding step with a threshold value so that only the selected standard patterns are used in the comparison making step.

3. The attribute decision method as claimed in claim 2, wherein decision results of the neural network are added to the output value or values of the feature value or values to obtain the total value in the calculating step.

4. The attribute decision method as claimed in claim 1, wherein the membership function to be created from the at least one selected feature value of each of the standard patterns is so set that a high value is outputted when the at least one feature value is inputted, and low values are outputted for values before and after the at least one feature value.

5. The attribute decision method as claimed in claim 2, wherein the membership function to be created from the at least one selected feature value of each of the standard patterns is so set that a high value is outputted when the at least one feature value is inputted, and low values are outputted for values before and after the at least one feature value.

6. The attribute decision method as claimed in claim 1, wherein when plural feature values are selected in the comparison making step, in the calculating step, the total value is obtained by adding to each other the output values of the feature values for each of the standard patterns.

7. The attribute decision method as claimed in claim 1, wherein four of the seven feature values are used which are the vertical structure vector sums and the horizontal structure vector sums.

8. The attribute decision method as claimed in claim 2, wherein four of the seven feature values are used which are the vertical structure vector sums and the horizontal structure vector sums.

9. An attribute decision method comprising steps of:
    making a comparison between at least one feature value, selected from seven feature values, of an input pattern contained in an input image and membership functions determined from 26 standard patterns including alphabetic characters of "A" to "Z" with respect to the at least one selected feature value and then obtaining output values of the membership functions for the individual standard patterns with respect to the input pattern,
    the seven feature values being, when the input pattern is a mesh pattern, vertical structure vector sums which are obtained by determining a number of white meshes counted along each column top to bottom and bottom to top until a first black mesh is encountered in data of the mesh pattern and by summing up their results,
    horizontal structure vector sums which are obtained by determining a number of white meshes counted along each row left to right and right to left until a first black mesh is encountered in the data of the mesh pattern and by summing up their results,
    up-down and left-right area differences which are obtained by determining differences in areas of black meshes between upper and lower halves and between left and right halves in the data of the mesh pattern, and
    a vertical cross number which is obtained by determining a number of times of crossing with black meshes counted along a center of columns in a vertical direction;
    calculating a total value of the output value for the at least one feature value for each of the standard patterns; and
    determining a standard pattern of the highest total value among the calculated total values and thus deciding one of the standard patterns which has the highest similarity to the input pattern.

10. The attribute decision method as claimed in claim 9, further comprising, before the comparison making step, steps of:
    previously deciding one of the standard patterns which has the highest similarity by using a neural network with respect to the input pattern contained in the input image; and
    selecting a plurality of upper-order standard patterns by comparing results of the preceding step with a threshold value so that only the selected standard patterns are used in the comparison making step.

11. The attribute decision method as claimed in claim 10, wherein decision results of the neural network are added to the output value or values of the feature value or values to obtain the total value in the calculating step.

12. The attribute decision method as claimed in claim 9, wherein the membership function to be created from the at least one selected feature value of each of the standard patterns is so set that a high value is outputted when the at least one feature value is inputted, and low values are outputted for values before and after the at least one feature value.

13. The attribute decision method as claimed in claim 11, wherein the membership function to be created from the at least one selected feature value of each of the standard patterns is so set that a high value is outputted when the at least one feature value is inputted, and low values are outputted for values before and after the at least one feature value.

14. The attribute decision method as claimed in claim 9, wherein when plural feature values are selected in the comparison making step, in the calculating step, the total value is obtained by adding to each other the output values of the feature values for each of the standard patterns.

15. The attribute decision method as claimed in claim 9, wherein four of the seven feature values are used which are the vertical structure vector sums and the horizontal structure vector sums.

16. The attribute decision method as claimed in claim 10, wherein four of the seven feature values are used which are the vertical structure vector sums and the horizontal structure vector sums.

17. The attribute decision method as claimed in claim 16, further comprising, before the comparison making step, steps of:
    previously deciding one of the standard patterns which has the highest similarity by using a neural network with respect to the input pattern contained in the input image; and
    selecting a plurality of upper-order standard patterns by comparing results of the preceding step with a threshold value so that only the selected standard patterns are used in the comparison making step.

18. An attribute decision method comprising steps of:
    making a comparison between at least one feature value, selected from seven feature values, of an input pattern contained in an input image and membership functions determined from 10 standard patterns including numerical characters of "1" to "0" with respect to the at least one selected feature value and then obtaining output values of the membership functions for the individual standard patterns with respect to the input pattern, the seven feature values being, when the input pattern is a mesh pattern, vertical structure vector sums which are obtained by determining a number of white meshes counted along each column top to bottom and bottom to top until a first black mesh is encountered in data of the mesh pattern and by summing up their results, horizontal structure vector sums which are obtained by determining a number of white meshes counted along each row left to right and right to left until a first black mesh is encountered in the data of the mesh pattern and by summing up their results, up-down and left-right area differences which are obtained by determining differences in areas of black meshes between upper and lower halves and between left and right halves in the data of the mesh pattern, and a vertical cross number which is obtained by determining a number of times of crossing with black meshes counted along a center of columns in a vertical direction;

calculating a total value of the output value for the at least one feature value for each of the standard patterns; and determining a standard pattern of the highest total value among the calculated total values and thus deciding one of the standard patterns which has the highest similarity to the input pattern.

19. The attribute decision method as claimed in claim 18, further comprising, before the comparison making step, steps of:

previously deciding one of the standard patterns which has the highest similarity by using a neural network with respect to the input pattern contained in the input image; and selecting a plurality of upper-order standard patterns by comparing results of the preceding step with a threshold value so that only the selected standard patterns are used in the comparison making step.

20. The attribute decision method as claimed in claim 19, wherein decision results of the neural network are added to the output value or values of the feature value or values to obtain the total value in the calculating step.

21. The attribute decision method as claimed in claim 18, wherein the membership function to be created from the at least one selected feature value of each of the standard patterns is so set that a high value is outputted when the at least one feature value is inputted, and low values are outputted for values before and after the at least one feature value.

22. The attribute decision method as claimed in claim 19, wherein the membership function to be created from the at least one selected feature value of each of the standard patterns is so set that a high value is outputted when the at least one feature value is inputted, and low values are outputted for values before and after the at least one feature value.

23. The attribute decision method as claimed in claim 18, wherein when plural feature values are selected in the comparison making step, in the calculating step, the total value is obtained by adding to each other the output values of the feature values for each of the standard patterns.

24. The attribute decision method as claimed in claim 18, wherein four of the seven feature values are used which are the vertical structure vector sums and the horizontal structure vector sums.

25. The attribute decision method as claimed in claim 19, wherein four of the seven feature values are used which are the vertical structure vector sums and the horizontal structure vector sums.

26. The attribute decision method as claimed in claim 25, further comprising, before the comparison making step, steps of:

previously deciding one of the standard patterns which has the highest similarity by using a neural network with respect to the input pattern contained in the input image; and selecting a plurality of upper-order standard patterns by comparing results of the preceding step with a threshold value so that only the selected standard patterns are used in the comparison making step.

\* \* \* \* \*